(12) United States Patent
Hayashi et al.

(10) Patent No.: US 10,165,141 B2
(45) Date of Patent: Dec. 25, 2018

(54) IMAGE READING APPARATUS, IMAGE FORMING APPARATUS, IMAGE FORMING SYSTEM, IMAGE FORMING METHOD, AND NON-TRANSITORY COMPUTER-READABLE RECORDING MEDIUM WHICH STORES IMAGE FORMING CONTROL PROGRAM THEREIN

(71) Applicant: KONICA MINOLTA, INC., Chiyoda-ku, Tokyo (JP)

(72) Inventors: Kenichi Hayashi, Tokyo (JP);
Hiroyuki Futami, Tokyo (JP);
Katsunori Takahashi, Tokyo (JP);
Takashi Nara, Saitama (JP); Tatsuhiro Noutomi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 154 days.

(21) Appl. No.: 15/282,775

(22) Filed: Sep. 30, 2016

(65) Prior Publication Data
US 2017/0104884 A1    Apr. 13, 2017

(30) Foreign Application Priority Data

Oct. 9, 2015  (JP) ................................ 2015-201130

(51) Int. Cl.
*H04N 1/04* (2006.01)
*H04N 1/00* (2006.01)

(52) U.S. Cl.
CPC ..... *H04N 1/00816* (2013.01); *H04N 1/00819* (2013.01); *H04N 2201/0094* (2013.01)

(58) Field of Classification Search
CPC ........... H04N 1/00816; H04N 1/00819; H04N 2201/0094

(Continued)

(56) References Cited

U.S. PATENT DOCUMENTS 6,141,120 A * 10/2000 Falk ..................... H04N 1/6033
                                                        358/504
8,749,846 B2    6/2014 Ito
2013/0258364 A1  10/2013 Ito

FOREIGN PATENT DOCUMENTS

JP    2007030340 A    2/2007
JP    2009124458 A    6/2009
JP    2013207616 A   10/2013

OTHER PUBLICATIONS

Japanese Office Action dated Nov. 11, 2017 issued in counterpart Japanese Application No. 2015-201130.

* cited by examiner

*Primary Examiner* — Houshang Safaipour
(74) *Attorney, Agent, or Firm* — Holtz, Holtz & Volek PC

(57) ABSTRACT

An image forming apparatus includes: an image forming section that forms an image; and an image forming control section that acquires information on a detection result of the image by a first image detecting section which has relatively higher failure detection accuracy than that of a second image detecting section, and information on a detection result of the image by the second image detecting section which has relatively higher color measurement accuracy than that of the first image detecting section, wherein the image forming control section acquires second image detection information in a region that has been detected by the second image detecting section and in which an exclusion detection region has been removed, based on the exclusion detection region that has been determined to contain a failure in the image, by first image detection information based on the detection result of the first image detecting section.

26 Claims, 19 Drawing Sheets

(58) Field of Classification Search
USPC .......................................................... 358/521
See application file for complete search history.

FIG.10

| 1st | 2nd | 3rd | 4th |
|-----|-----|-----|-----|
| 1   |     |     |     |
| 1   | 2   |     |     |
| 1   | 2   | 3   |     |
| 1   | 2   |     | 4   |
| 1   | 2   | 3   | 4   |
| 1   |     | 3   |     |
| 1   |     | 3   | 4   |
| 1   |     |     | 4   |
|     | 2   |     |     |
|     | 2   | 3   |     |
|     | 2   | 3   | 4   |
|     | 2   |     | 4   |
|     |     | 3   |     |
|     |     | 3   | 4   |
|     |     |     | 4   |

A                    B

IMAGE READING APPARATUS, IMAGE FORMING APPARATUS, IMAGE FORMING SYSTEM, IMAGE FORMING METHOD, AND NON-TRANSITORY COMPUTER-READABLE RECORDING MEDIUM WHICH STORES IMAGE FORMING CONTROL PROGRAM THEREIN

The present U.S. patent application claims a priority under the Paris Convention of Japanese patent application No. 2015-201130 filed on Oct. 9, 2015, the entirety of which is incorporated herein by references.

BACKGROUND OF THE INVENTION

Field of the Invention

This invention relates to: an image reading apparatus that can acquire each of detection results of a first image detecting section which reads an image on a transfer medium and has high failure detection accuracy, and a second image detecting section which reads the image and has high color detection accuracy; an image forming apparatus; an image forming system; an image forming method; and a non-transitory computer-readable recording medium which stores an image forming control program therein.

Description of the Related Art

In an image forming apparatus such as a printer and a multifunctional machine, an image forming apparatus is conventionally known which prints a color patch, detects a patch of the output image by a color concentration sensor and the like, compares the detected patch with original print data, corrects printing density and the like when a difference occurs between the patch and the data, and forms an image, in order to enhance an image quality of an output image.

The size of the patch which is printed on paper in such an image adjustment mode is preferably controlled to be a small size as much as possible in a paper travel direction, in order to reduce paper for adjustment.

In recent years, in order to reduce image adjustment time period and the like in an image forming apparatus for further enhancing the image quality, the image forming apparatus also has appeared that is provided with an image reading apparatus which mounts an in-line image scanner. This image scanner can be used for correcting misalignment of the front and back of the paper, image density, tint and the like of the output image in real time. A line sensor is widely used in the image scanner, which uses CCD or CIS as an imaging element.

However, the image scanner is not excellent in color reproducibility, and accordingly has also such a feature that colorimetric accuracy cannot be guaranteed.

Then, if the image scanner mounts an in-line colorimeter for correctly measuring the tint and correcting an absolute color into print data, the colorimeter can contribute to a further reduction of the adjustment time period. A spectral colorimeter can be used for the colorimeter. The spectral colorimeter is an instrument which exposes a color patch to light of an LED or the like, disperses reflected light with a diffraction grating, collects the dispersed light with a CMOS sensor or the like, and derives the result as a hue expressed by L*a*b* or the like. The line sensor can detect the patch on the whole surface of the paper. Accordingly, if a correlation is taken between a true tint acquired by the colorimeter and color data acquired by the line sensor, and the line sensor is thereby corrected, it also becomes possible to form the patch on the whole surface of the paper and can also save the paper for adjustment.

Specifically, it is considered to read out the image by the line sensor, and periodically calibrate the line sensor by the spectral colorimeter of which the colorimetry accuracy is guaranteed, or the like.

In addition, it is effective to mount the colorimeter, also in managing the absolute color and tuning the print data. In order to accurately detect the hue, though the method includes repeated measurement with the spectral colorimeter, a predetermined detection time period is necessary, and when the spectrum is detected in multiple times and respective results are totalized, the accuracy can be thereby more enhanced.

When exposing the patch on a moving sheet of paper to light four times, receiving reflected light and integrating the light, for instance, and outputting the hue, the image reading apparatus accumulates the reflected light, as first measurement in a first colorimetric area, second measurement in a second colorimetric area, and so on, as is shown in FIG. 8. A portion which straddles a boundary between the first colorimetric area and the second colorimetric area is determined by an aperture size (visual field=spot) of the colorimeter. For instance, the exposure to light for 4 ms and the acquisition of spectral reflected light are repeated four times, and the values are averaged. When the colorimetry of the first colorimetric area has ended, the colorimetry of the second colorimetric area results in starting.

When the colorimeter concentrates on acquiring the hue and the image forming apparatus provides a signal of the colorimetry timing which corresponds to the patch position, it becomes thereby unnecessary to identify a boundary between different patches and it also becomes possible to keep the patch size small.

By the way, when the colorimeter measures the color, in the case where there are inconsistencies in density, dirt, a scratch and the like in the patch, there is a problem that the colorimeter cannot correctly measure the color and be calibrated.

In Japanese Patent Laid-Open No. 2007-30340, an image forming apparatus reads out an image by a sensor device which uses the colorimeter, a densitometer or the like, and adjusts the density of the toner image which is formed by an image forming unit according to the readout result, but when there is dirt on a part of the patch, makes it possible to form a patch image in a region other than the region, read out the patch image and adjust the output density.

In addition, in Japanese Patent Laid-Open No. 2009-124458, the method has a step of predicting whether or not there is abnormality in the patch for colorimetry, from a colorimetric result of an appropriate patch, and deriving the prediction value, and when the prediction value has exceeded a certain threshold value, makes it possible to report that the patch is not appropriate.

As has been described above, a line sensor which uses CCD (Charge Coupled Device) or CIS (Contact Image Sensor) as an imaging element is widely used in reading the image. The line sensor is suitable for reading at high speed, can read out an image fixed on transfer paper just at a conveyance speed of a fixed portion, can check color reproducibility, and inspect a printing position and the like. The line sensor can detect an image with a unit of μm, and as a result of having analyzed the image, can correctly specify a position of an abnormal image of a mixed foreign matter or the like.

On the other hand, in the spectral colorimeter, in order to enhance colorimetry accuracy, the colorimeter averages colorimetric results in the area containing several points and calculates the hue; and accordingly is excellent in a measurement accuracy of the color. However, the colorimeter needs to make the quantity of the integrated light per one patch constant, and when reading out the patch at the same conveyance speed as that of the line sensor, needs to elongate the patch length. However, when the patch length becomes long, the number of sheets of a chart necessary for calibration increases, and there is a problem that waste paper results in being produced per one calibration. In addition, the colorimeter is not suitable for determining an image failure.

However, as has been described above, when there is a failure portion in the patch, it becomes difficult to appropriately calibrate the line sensor on the basis of a result of reading by the colorimeter.

In Japanese Patent Laid-Open No. 2007-30340, the image forming apparatus needs to form a patch in another place so as to avoid an area of an abnormal image, and move the place for measuring the color there; and accordingly results in needing a movement mechanism for carrying the colorimeter to a matching place every time, and causing an increase of the cost. In addition, the image forming apparatus is an apparatus which changes the patch position to another place based on a premise that the area of the abnormal image is specified and is stably abnormal, and cannot cope with an accidentally abnormal image, dirt and the like.

In addition, in Japanese Patent Application Laid-Open No. 2009-124458, the method determines a predicted value, based on the colorimetric result of a patch in a correct state, and when the value is different from the predicted value, determines that the patch is not appropriate, and accordingly firstly needs to measure the color of the patch in the correct state; and when the colorimetry by the line sensor is not performed with reliability, the predicted value also becomes inappropriate. In addition, there is a problem that the abnormality cannot be surely eliminated, considering that the predicted value contains a prediction error. Furthermore, when the patch becomes inappropriate, the present patch becomes incapable of being used, and then the patch needs to be printed again, which causes a problem that paper for adjustment results in being wasted.

SUMMARY OF THE INVENTION

The present invention is designed with respect to the above described circumstances which are considered as the background, and an object is to provide: an image reading apparatus which can accurately and efficiently measure the color by using different image detecting sections, even when there is a failure in the image; an image forming apparatus; an image forming system; an image forming method; and a non-transitory computer-readable recording medium which stores an image forming control program therein.

Specifically, to achieve at least one of the abovementioned objects, according to an aspect, an image reading apparatus reflecting one aspect of the present invention includes:

a second image detecting section which has relatively higher color measurement accuracy than that of a first image detecting section and detects an image on a transfer medium; and a reading control section which controls the second image detecting section, and also acquires first image detection information based on a result that the first image detecting section has detected the image, the first image detecting section having relatively higher failure detection accuracy than that of the second image detecting section, wherein the reading control section acquires second image detection information in a region of an image that has been detected by the second image detecting section and in which an exclusion detection region has been removed, based on the exclusion detection region that has been determined to contain a failure in the image based on the first image detection information.

In the image reading apparatus according to the abovementioned aspect, it is preferable that the reading control section determines the exclusion detection region, based on the first image detection information of the first image detecting section.

In the image reading apparatus according to the abovementioned aspect, it is preferable that the first image detection information includes information on the exclusion detection region.

In the image reading apparatus according to the abovementioned aspect, it is preferable that the reading control section acquires the second image detection information from the second image detecting section which detects the image in a region in which the exclusion detection region has been removed.

In the image reading apparatus according to the abovementioned aspect, it is preferable that the reading control section acquires the second image detection information, based on a detection result in a region in which the exclusion detection region has been removed from a detection result by the second image detecting section.

In the image reading apparatus according to the abovementioned aspect, it is preferable that the reading control section acquires the second image detection information, based on a result of having totalized a plurality of measurement results which have been detected by the second image detecting section, in a region in which the exclusion detection region has been removed.

In the image reading apparatus according to the abovementioned aspect, it is preferable that the first image detection information is information that is notified from an image forming apparatus which has acquired a detection result of the first image detecting section.

In the image reading apparatus according to the abovementioned aspect, it is preferable that the first image detecting section is provided in the image reading apparatus.

In the image reading apparatus according to the abovementioned aspect, it is preferable that the reading control section transmits the second image detection information to an image forming apparatus that has notified the first image detection information to the image reading apparatus.

In the image reading apparatus according to the abovementioned aspect, it is preferable that the image reading apparatus further includes a transfer medium conveyance section that conveys a transfer medium, and the second image detecting section detects an image which is conveyed by the transfer medium conveyance section, and the reading control section further controls the transfer medium conveyance section.

In the image reading apparatus according to the abovementioned aspect, it is preferable that, in a case where the region in which the exclusion detection region has been removed does not reach a predetermined amount, the reading control section corrects detection timing of the second image detecting section.

In the image reading apparatus according to the abovementioned aspect, it is preferable that, in a case where the region in which the exclusion detection region has been removed does not reach the predetermined amount, the reading control section corrects the detection timing of the second image detecting section, and also lowers a conveyance speed of a transfer medium or stops conveyance of the transfer medium to secure a detection time period.

In the image reading apparatus according to the abovementioned aspect, it is preferable that In the image reading apparatus according to the abovementioned aspect, it is preferable that, in a case where the region in which the exclusion detection region has been removed does not reach the predetermined amount or does not exist, in a conveyance direction of the transfer medium, the reading control section shifts one or both of the second image detecting section and the transfer medium in a direction that intersects with the conveyance direction of the transfer medium.

In the image reading apparatus according to the abovementioned aspect, it is preferable that, in a case where a normal region cannot be secured as the second image detection information, as a result of having removed the exclusion detecting region, the reading control section invalidates the detection result which the second image detecting section has acquired.

In the image reading apparatus according to the abovementioned aspect, it is preferable that the first image detecting section is an image sensor and the second image detecting section is a spectral colorimeter.

To achieve at least one of the abovementioned objects, according to an aspect, an image forming apparatus reflecting one aspect of the present invention includes: an image forming section that forms an image on a transfer medium; and an image forming control section that controls the image forming section, and also acquires information on a detection result of the image on the transfer medium by a first image detecting section which has relatively higher failure detection accuracy than that of a second image detecting section, and information on a detection result of the image on the transfer medium by the second image detecting section which has relatively higher color measurement accuracy than that of the first image detecting section, wherein the image forming control section acquires second image detection information in a region that has been detected by the second image detecting section and in which an exclusion detection region has been removed, based on the exclusion detection region that has been determined to contain a failure in the image, by first image detection information based on the detection result of the first image detecting section.

To achieve at least one of the abovementioned objects, according to an aspect, an image forming system reflecting one aspect of the present invention includes: an image forming section that forms an image on a transfer medium; a first image detecting section that has relatively higher failure detection accuracy than that of a second image detecting section, and detects the image on the transfer medium; the second image detecting section that has relatively higher color measurement accuracy than that of the first image detecting section, and detects the image on the transfer medium; and a control section which controls the image forming section, and acquires information on a detection result of the first image detecting section and a detection result of the second image detecting section, wherein when it has been determined that there is a failure in the image, based on the first image detection information by the detection result of the first image detecting section, the control section acquires second image detection information in a region that is detected by the second image detecting section and in which an exclusion detection region has been removed, based on the exclusion detection region.

To achieve at least one of the abovementioned objects, according to an aspect, an image forming method reflecting one aspect of the present invention includes: a step of determining an exclusion detection region that is determined to contain a failure in an image, from a detection result that a first image detecting section which has relatively higher failure detection accuracy than that of a second image detecting section has detected the image on a transfer medium; and a step of determining second image detection information in a region in which the exclusion detection region has been removed based on a detection result that the second image detecting section which has relatively higher color measurement accuracy than that of the first image detecting section has detected the image on the transfer medium.

To achieve at least one of the abovementioned objects, according to an aspect, a non-transitory computer-readable recording medium which stores an image forming control program therein reflecting one aspect of the present invention is a non-transitory computer-readable recording medium that stores an image forming control program therein which is executed by a computer that controls an image forming apparatus, in order to make the image forming apparatus execute the image forming method.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 10 is an example of data showing a detection result by the colorimeter;

DETAILED DESCRIPTION OF THE PREFERRED EMBODIMENTS

Figure 1:
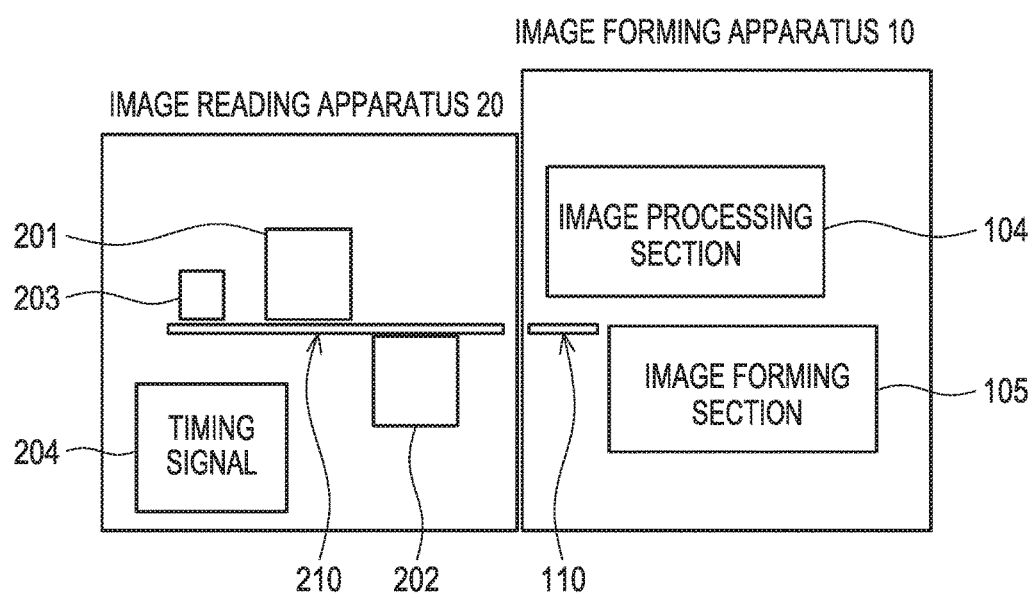
FIG. 1 is a schematic view showing an image forming system according to one embodiment of the present invention.

Hereinafter, an embodiment of the present invention will be described with reference to the drawings. However, the scope of the invention is not limited to the illustrated examples.

One embodiment of the present invention will be described below with reference to the attached drawings.

An image forming system 1 includes an image forming apparatus 10 which forms an image on paper, and an image reading apparatus 20 which detects the image formed on the paper; and in this embodiment, the image reading apparatus 20 is electrically and mechanically connected to the downstream side of the image forming apparatus 10. However, in the present invention, it is not indispensable that the image forming apparatus and the image reading apparatus are connected to each other in-line, but the image forming apparatus and the image reading apparatus may have an off-line relationship, and may deliver data concerning the colorimetry to and receive the data from each other.

The image forming apparatus 10 has an image processing section 104 which processes image data.

The image forming apparatus 10 includes an image forming section 105 that receives the image data which has been subjected to image processing in the image processing section 104, and forms an image on the paper.

The image forming apparatus 10 can perform image optimization processing (image adjustment processing) of optimizing image data, by transferring the image detection result which the image reading apparatus 20 has read out to the image processing section 104, comparing the image detection result with print data, calculating a hue that is required on the basis of the read-out hue, and printing the image so that a desired hue is output. The image optimization includes adjustment of printing positions of the front and back faces, adjustment of density, adjustment of tint, and the like.

Incidentally, in this example, it has been described that the image processing section 104 is provided in the image forming apparatus, but the image processing section 104 may also be provided in the image reading apparatus or another apparatus that is, for instance, a management apparatus which will be described later.

The image forming apparatus 10 has a paper conveyance section 110 which conveys the paper in the image forming apparatus 10, and conveys the paper on which the image has been formed, to the image reading apparatus 20. A conveyance path provided in the paper conveyance section 110 is connected to a conveyance path of a paper conveyance section 210 in the image reading apparatus 20. The conveyance path constitutes a part of the paper conveyance sections in each of the apparatuses. The paper conveyance section includes a roller, a conveyance motor and the like.

Incidentally, the paper corresponds to the transfer medium of the present invention. In this embodiment, the paper is used as the transfer medium, but in the present invention, the transfer medium is not limited to the paper.

The image reading apparatus 20 has the paper conveyance section 210 that includes a conveyance path which is connected to the conveyance path of the image forming apparatus 10; and has a line sensor 202 for a back face, a line sensor 201 for a front face, and a colorimeter 203 which measure the color of the image on the paper S that is conveyed by the paper conveyance section 210, along a conveyance direction. The line sensor 202 for the back face and the line sensor 201 for the front face include sensors such as a CCD sensor, a CIS sensor and a CMOS sensor, scan the image in a direction in which the paper travels while regarding a breadth of the paper as one line, and thereby can acquire the image on the whole surface of the paper. Incidentally, the image reading apparatus may have one line sensor, and have such a structure that the paper is inverted and circulated.

The line sensors 201 and 202 correspond to the first image detecting section of the present invention, and the colorimeter 203 corresponds to the second image detecting section of the present invention.

The colorimeter 203 is a spectral colorimeter; and calculates reflected light of each of the spectra to Lab color space data or XYZ color space data, and derives a tint. The colorimeter 203 irradiates a patch of which the color is measured with visible light, and acquires the optical spectrum of the reflected light. In addition, the colorimeter 203 acquires the reflected light of an ultraviolet light source and calculates the hue, in order to eliminate an influence of a fluorescent material of paper for colorimetry and bring a colorimetric value close to a correct value. A lens portion through which the colorimeter acquires the reflected light is approximately 4 mm, and a patch size of 4 mm+α becomes necessary in the paper width direction, per one colorimeter. A timing signal is given to the colorimeter from the outside, and the colorimeter performs the colorimetry at the timing. It becomes possible to reduce the adjustment paper, by forming as many color patches as possible in the paper travel direction. For instance, in the case of A3 paper of 420 mm, when a patch size is approximately 20 mm, approximately 20 pieces of patches can be formed in the paper travel direction. The color is measured while the paper having a patch size of 20 mm travels at a predetermined speed. When the paper travels at a speed of 20 mm/second, for instance, the colorimeter needs to finish the colorimetric operation within 0.1 seconds. Practically, the value becomes a patch size, which is a sum of a distance that is determined from a time period during which the color is surely measured and the travel speed and of a margin.

When the colorimeter 203 is measuring the color, the line sensors 201 and 202 collect color data of RGB. The color data which have been collected by the colorimeter 203 and the line sensors 201 and 202 are data detected for the same patch, and accordingly Lab data of the colorimeter 203 is associated with RGB data of the line sensors 201 and 202, in the image processing section 104. In other words, the RGB data results in being corrected into the colorimetric value. Thereby, the line sensors 201 and 202 become possible to measure the color of the whole surface of the paper.

In addition, the image reading apparatus 20 has a timing signal section 204 which supplies the timing signal to the colorimeter 203 from the outside.

Figure 2:
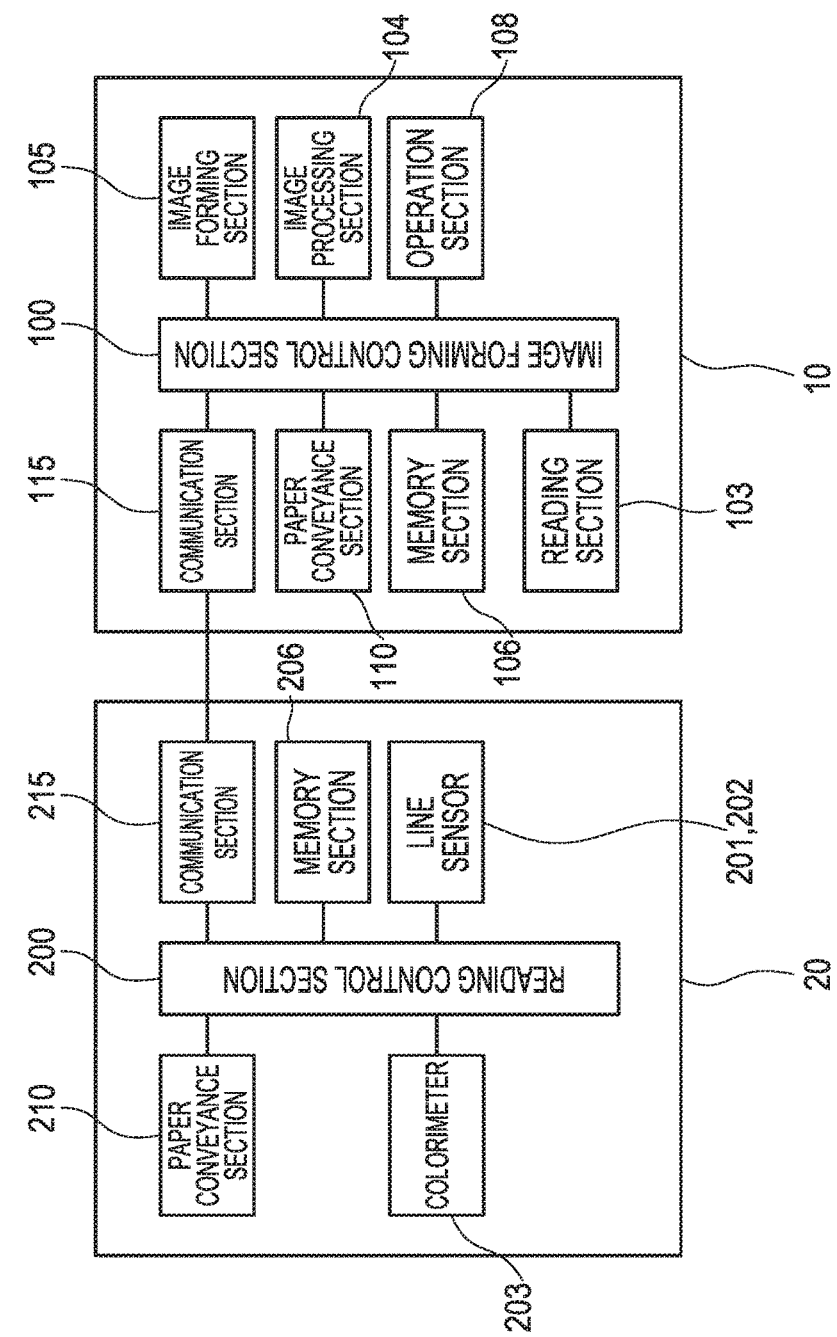
FIG. 2 is a view showing control blocks.

Next, the control blocks of the image forming system are shown in FIG. 2.

The image forming apparatus 10 has an image forming control section 100 which controls the whole of the image forming apparatus. The image forming control section 100 can be configured from a CPU, a program that makes the CPU operate, and the like.

A memory section 106 is connected to the image forming apparatus 10; and nonvolatilely stores the program, an operation parameter and the like therein, and has a RAM region which becomes a working area, an image memory which stores the image data therein, and the like. In addition, the memory section 106 can store therein: data of an image patch for use in the colorimetry; and color information for discriminating a color boundary, which includes information, for instance, on colors of images before and after the color boundary, on a specific wavelength, on the amount of wavelengths which should be detected, and on a threshold value for discriminating the boundary. The boundary discrimination information such as wavelength information, the necessary amount of wavelengths, and a threshold value for determining a patch change show high sensitivity in the change when an image color is switched. In addition, the memory section 106 may also record the detection results of the line sensors 201 and 202 and the colorimeter 203 therein.

In addition, the image processing section 104 and the image forming section 105 are connected to the image forming apparatus 10 so as to be controllable by the image forming control section 100.

Furthermore, an operation section 108 is connected controllably to the image forming control section 100. The operation section 108 can receive an operation input of a user, and can give such directions as to execute image formation and create the patch image for colorimetry. In addition, information can be displayed on the operation section 108. Incidentally, the image forming apparatus 10 may have a display section separately from the operation section 108.

Furthermore, a paper conveyance section 110 is connected controllably to the image forming control section 100. The paper conveyance section 110 feeds the paper, conveys the paper to the image forming section 105, and further can eject the paper to the image reading apparatus 20.

In addition, a communication section 115 is connected controllably to the image forming control section 100. The communication section 115 can communicate with a communication section 215 of the image reading apparatus 20; and can transmit data to the image reading apparatus 20 and can receive data from the image reading apparatus 20.

When the image reading apparatus 20 measures the color, for instance, the image forming control section 100 can transmit the color information concerning the color boundary to the image reading apparatus 20 through the communication section 115. In addition, the image forming apparatus 10 may analyze a portion of the abnormal image from the detection results of the line sensors 201 and 202, and transmit the information on the exclusion detection region to the image reading apparatus 20. In addition, the image forming apparatus 10 may receive the detection result of the colorimeter 203 from the image reading apparatus 20, and may acquire the second image detection information in which the exclusion detection region has been removed by the image forming control section 100, or may acquire the second image detection information in which the exclusion detection region has been removed, from the image reading apparatus 20.

Furthermore, a reading section 103 is connected to the image forming control section 100, the memory section 106 stores the image data therein which has been read out by the reading section 103, and the image forming section 105 can form the image on the paper. Incidentally, the image forming apparatus 10 may acquire the image data from its outside, and can acquire, for instance, through a network or a removable memory section.

The image reading apparatus 20 has a reading control section 200 which controls the whole colorimetry apparatus. The reading control section 200 can be configured from a CPU, a program that makes the CPU operate, and the like.

The colorimeter 203 is connected controllably to the reading control section 200. The reading control section 200 controls the line sensor 201 for the front face and the line sensor 202 for the back face, and can further control the colorimeter 203 according to the boundary discrimination mode and the colorimetry mode. In addition, the reading control section 200 can receive the readout results of the line sensors 201 and 202 and the readout result of the colorimeter 203.

In addition, the memory section 206 is connected controllably to the reading control section 200. The memory section 206 can store therein: a program; an operation parameter of the image reading apparatus 20; spectral reflection data of each of the colors; boundary discrimination condition data according to image colors before and after the boundary; and the like. In addition, the reading control section 200 can calculate a specific wavelength according to the measured image color.

Furthermore, a paper conveyance section 210 is connected controllably to the reading control section 200, and the reading control section 200 can control the conveyance of the paper. For instance, the reading control section 200 can adjust the speed of the paper conveyed by the paper conveyance section 210, according to the number of the amount of wavelengths which should be detected. The conveyance speed to be adjusted can be stored readably in the memory section 206, or the paper conveyance section 210 may receive directions for a speed from the image forming control section 100, and determine the speed.

In addition, a communication section 215 is connected controllably to the reading control section 200, and can transmit and receive data to and from the image forming apparatus 10. The communication section 215 can transmit the readout results of the line sensors 201 and 202 and the colorimetric result of the colorimeter 203 in the colorimetry mode, to the image forming apparatus 10. In addition, the communication section 215 may receive the analysis result of the abnormal image by the line sensors 201 and 202 from the image forming apparatus 10, and the reading control section 200 may obtain the second image detection information from the colorimetric result of the colorimeter 203.

In the image forming control section 100 which has received the readout result in the line sensors 201 and 202, the image processing section 104 compares the print data with the colorimetric data, and can perform image adjustment correction (image optimization) for image formation, and the like, as needed. The image optimization includes adjustment of printing positions of the front and back faces, adjustment of density, adjustment of tint, and the like.

For instance, when the colorimeter 203 is measuring the color, the line sensor 201 collects color data of RGB. The color data which have been collected by the colorimeter 203 and the line sensor 201 are data detected for the same image patch, and accordingly Lab data of the colorimeter is associated with RGB data of the line sensor 201, in the image processing section 104. In other words, the RGB data results in being corrected into the colorimetric value. Thereby, the line sensor becomes possible to measure the color of the whole surface of the paper. In the calibration mode, the image forming control section 100 can calibrate the line sensor by comparing the colorimetric result with the readout results of the line sensors 201 and 202.

Incidentally, in the above described embodiment, the example has been described in which the image reading apparatus having the line sensor and the colorimeter is connected to the image forming apparatus, from the outside of the image forming apparatus, but the line sensor and the colorimeter does not need to be provided in the same apparatus, and may be provided separately in different apparatuses. The line sensor and the colorimeter may be provided separately in different apparatuses, in the outside of the image forming apparatus.

Figure 3:
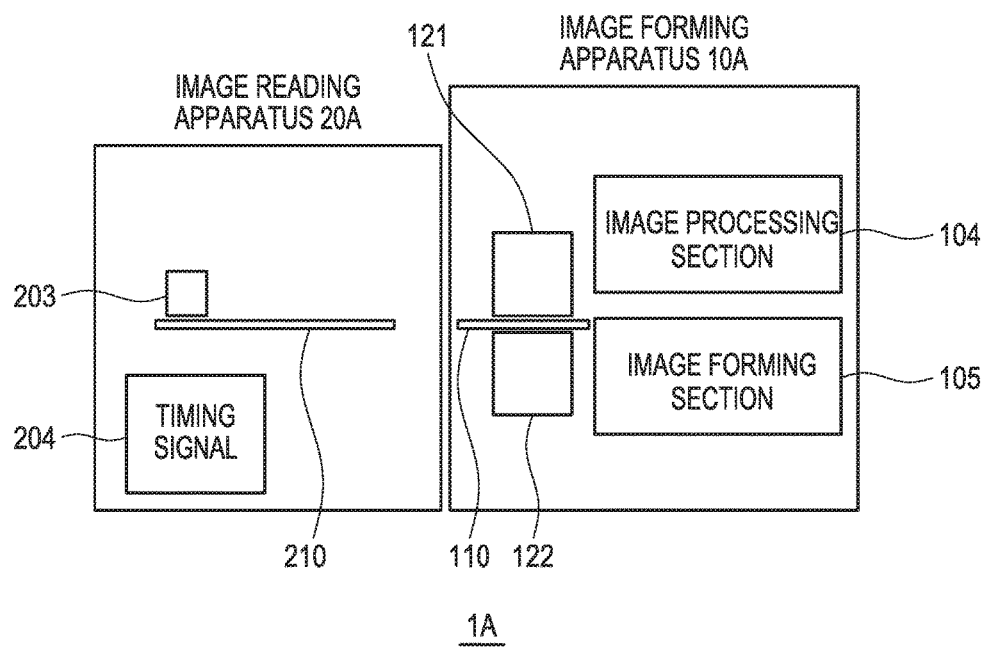
FIG. 3 is a schematic view showing an image forming system according to another embodiment of the present invention.

FIG. 3 shows an image forming system 1A that has an image forming apparatus 10A in which a line sensor 121 for a front face and a line sensor 122 for a back face are provided, and has an image reading apparatus 20A that has a colorimeter 203 therein and is connected to the image forming apparatus 10A. Incidentally, the same configuration as the above described embodiment will be designated by the same reference numerals, and the description will be omitted or simplified.

Specifically, the image forming apparatus 10A has the image processing section 104 and the image forming section 105; and the image reading apparatus 20A has the timing signal section 204.

In addition, in each of the above described embodiments, it has been described that the image forming control section or the image reading apparatus analyzes the readout result and acquires the second image detection information. Accordingly, in the image forming system, the image forming control section or the reading control section can function as a control section. In addition, when the above sections analyze the readout result and acquire the second image detection information while cooperating with each other, the image forming control section and the reading control section function as the control section.

Furthermore, the management apparatus which manages the image forming apparatus may be configured to perform the processing of the readout result in the image detecting section. In this case, the management control section provided in the management apparatus results in functioning as the control section of the present invention.

The image forming control program which executes the image forming method of the present embodiment is stored in the memory section 106 when the program is executed in the image forming control section 100, is stored in the memory section 206 when the program is executed in the reading control section 200, and is stored in a memory section 510 when the program is executed in a management control section 500. The memory section which stores the image forming control program therein corresponds to the non-transitory computer-readable recording medium in the present invention.

Incidentally, the image forming control program of the present invention may be stored in a portable memory section or the like, be distributed and be moved.

Figure 4:
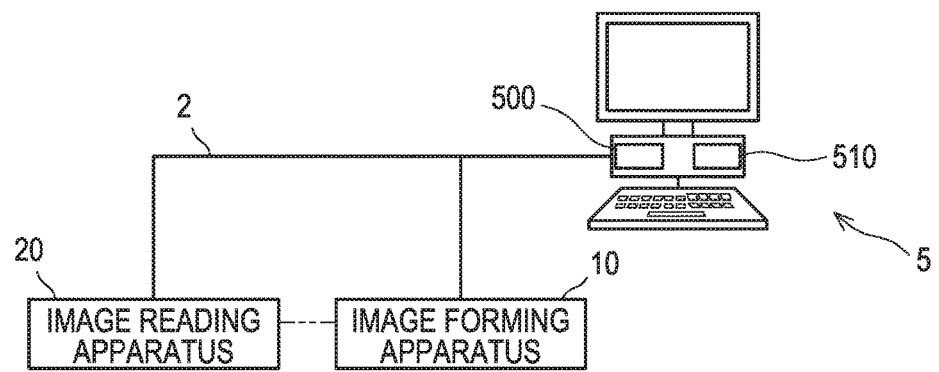
FIG. 4 is a schematic view showing an image forming system according to further another embodiment.

FIG. 4 shows a configuration in which the image forming apparatus 10 and the image reading apparatus 20 are connected to the management apparatus 5 through the network 2. Incidentally, the image reading apparatus 20 may not be connected to the management apparatus 5 through the network.

In this configuration, the image forming apparatus 10 and/or the image reading apparatus 20 can transmit the detection results of the line sensors 201 and 202 and/or the detection result of the colorimeter 203, to the management apparatus 5 through the network 2. The management apparatus 5 has a management control section 500 and a memory section 510, and the memory section 510 can store the detection results of the line sensors 201 and 202 and the detection result of the colorimeter 203 therein.

The management control section 500 receives the detection results of the line sensors 201 and 202, acquires the first image information, analyzes the abnormal image, and can determine the exclusion detection region. The management control section 500 may notify this exclusion detection region to the apparatus having the colorimeter, and may direct the colorimeter so as to measure the color in regions in which the exclusion detection region has been removed; or may acquire the detection result of the colorimeter, and remove the exclusion detection region from the detection result to acquire the second image detection information.

Next, the state in which the patch of the image is read will be described below with reference to FIG. 5. Incidentally, in the image forming systems in FIG. 1 and FIG. 3, the distance between the line sensors and the colorimeter is different from that of the other system, but both of the systems can sequentially read out the image patch along the conveyance direction.

Figure 5:
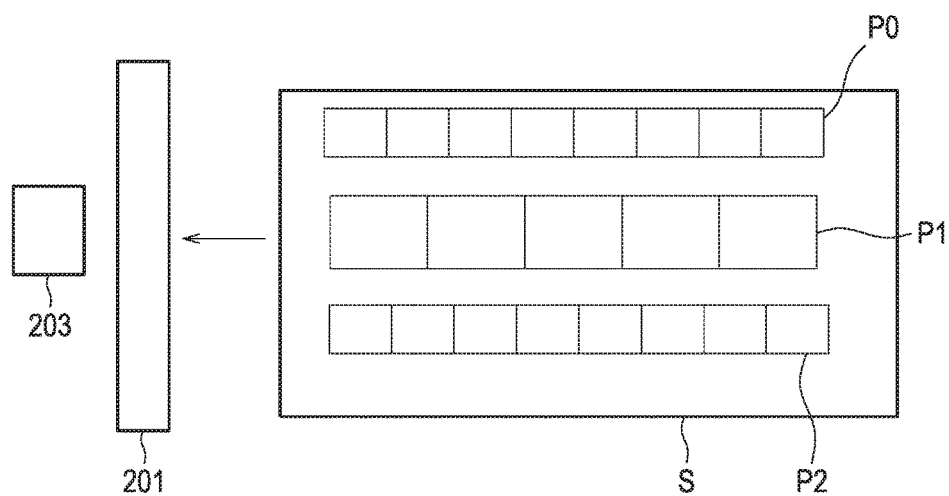
FIG. 5 is a view for describing another example of a detection state of an image in one embodiment of the present invention.

In FIG. 5, the line sensor 201 for the front face is arranged perpendicularly to the conveyance direction of the paper S so as to cover the paper width, and the colorimeter 203 is arranged so as to measure the color of the surface of the paper S at the downstream side in the conveyance direction. The colorimeter 203 can measure the color of a predetermined region in an approximately middle of the paper width.

In the paper S of this example, patch images P0, P1 and P2 which are formed of a plurality of colors are formed in respectively different columns along the conveyance direction of the paper, and the patch images have the color boundaries between the plurality of colors, respectively.

The line sensors 201 and 202 read out the image by scanning the image in a direction in which the paper travels, while regarding a breadth of the scanning direction as one line.

On the other hand, the colorimeter 203 measures the color in a predetermined area according to the timing signal that is supplied from the timing signal section 204.

Figure 6:
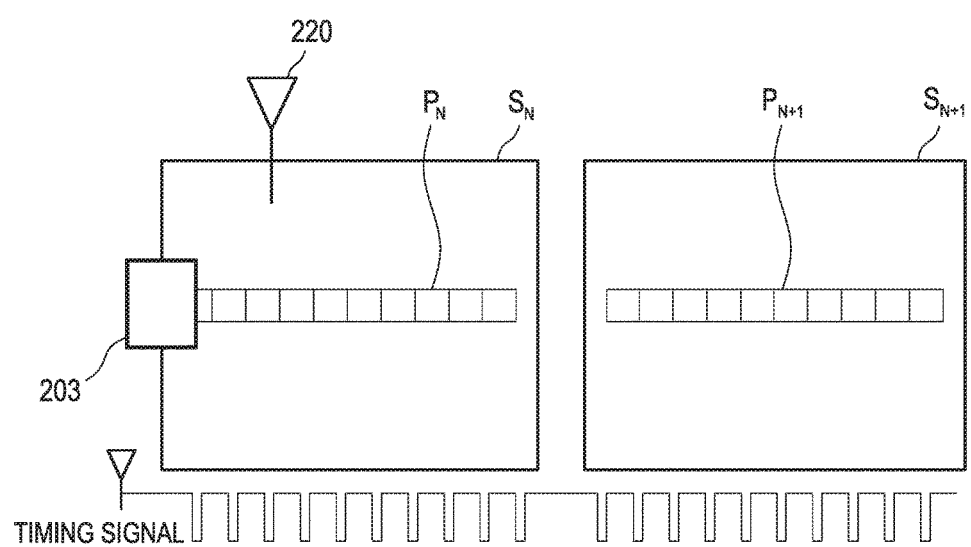
FIG. 6 is a view for describing image detection timing, similarly.
Figure 7:
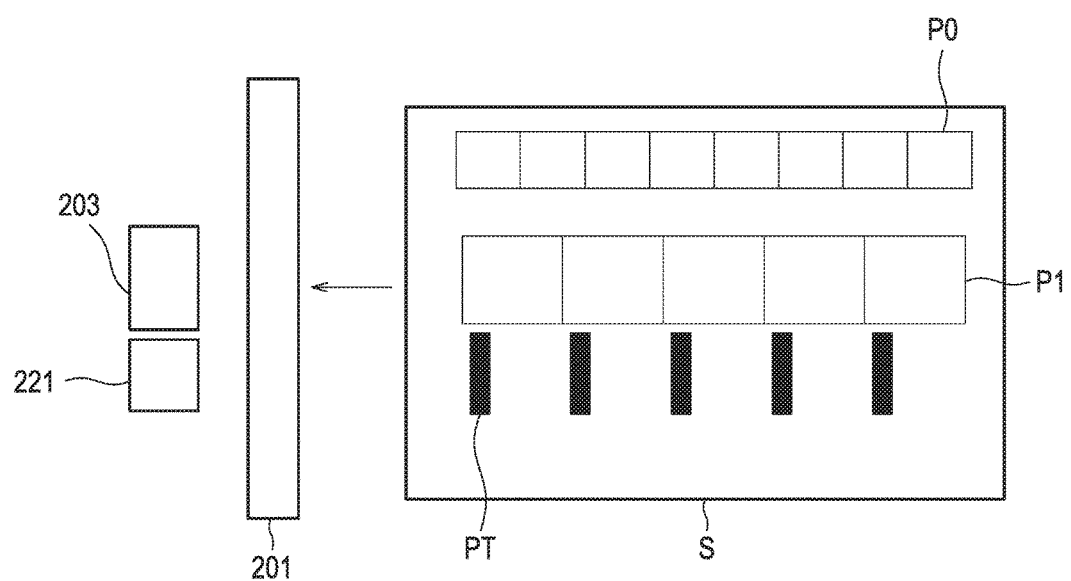
FIG. 7 is a view for describing another example of the image detection timing, similarly.

As is shown in FIG. 6, a paper leading-edge detection sensor 220 is arranged in the conveyance path in the vicinity of the colorimeter 203, and can detect the leading-edge of the paper that is conveyed on the conveyance path. When the paper leading-edge detection sensor 220 detects the leading-edge of the paper S, the timing signal section 204 generates timing signals for the patch head and each of the patch spaces from the paper leading-edge, which correspond to the amount of the patches in each sheet, for portions of patch images PN and $P_{N+1}$ in each of Nth paper and (N+1)th paper. If the patches are arranged at equal intervals, the timing signals are generated at equal intervals. As for the generation of the timing signal, reference markers PT may be printed in a lateral side in the scanning direction of the patch images P0 and P1 having each color, as is shown in FIG. 7, the detection sensor 221 reads out the reference markers, and the timing signal section 204 may generate the timing signals.

Next, the colorimetric operation in the colorimeter 203 will be described below, which is performed after the timing signal has been generated.

Figure 8:
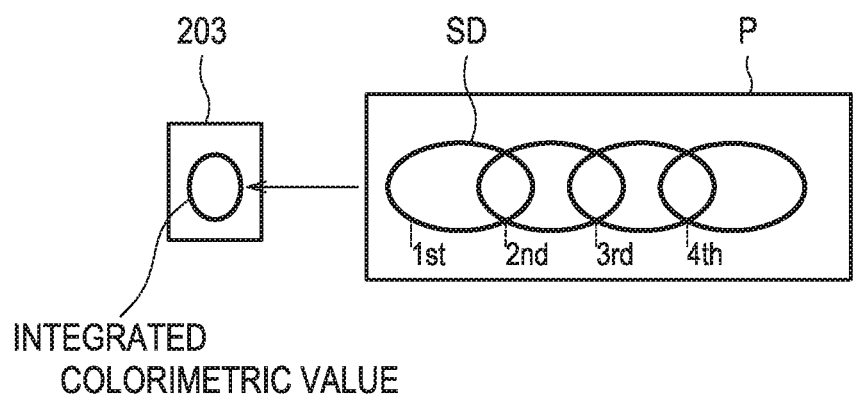
FIG. 8 is a view for describing a colorimetry state of a colorimeter.

As is shown in FIG. 8, the timing signal section considers a spot diameter of the colorimeter 203 and generates the timing signal at such a timing that the whole patch of the same color fit in the spot. The colorimeter 203 starts first acquisition of spectral reflected light in a predetermined colorimetric area SD. Incidentally, the size of the spot diameter is not limited in particular, but includes, for instance, a diameter of 20 mm or less.

The colorimeter starts second acquisition of spectral reflected light at such a timing that a time period for collecting predetermined reflected light has elapsed. The colorimeter similarly continues third acquisition and fourth acquisition. Here, a time period for collecting reflected light in every time shall be 4 milliseconds. Each of the first to fourth spectral states of reflected light is integrated in each spectroscopic measurement, and is subjected to averaging processing. The averaged value becomes spectral reflection data. The spectral reflection data is converted into a hue value such as L*a*b*. It is also acceptable to convert the spectral reflection data into the hue values and then subject the hue values to averaging processing.

Next, the countermeasure at the time when the abnormality has occurred in the patch image will be described below, which is included in the present invention.

Firstly, the line sensor 201 in the front stage of the colorimeter 203 acquires the image on the whole surface of the paper. The line sensor 201 analyzes the acquired image, and detects whether there is abnormality in the patch or not. The countermeasure in the case where there is the following abnormality as a result of the analysis will be described below.

Figure 9:
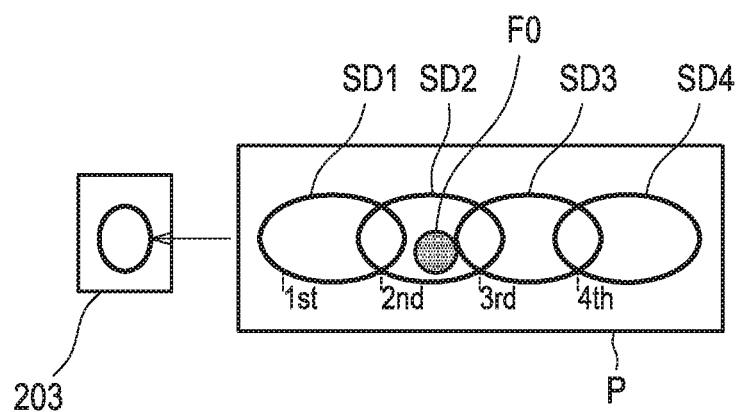
FIG. 9 is a view for describing an example in which there is an image failure in an image patch.

As is shown in FIG. 9, suppose that a dust deposits in the center of a second colorimetric area SD2 among a plurality of times of first to fourth colorimetric areas SD1, SD2, SD3 and SD4, and the second colorimetric area SD2 has a failure region F0 of the image. This failure region F0 is determined by the detection result of the line sensor 201 or the line sensor 202.

In this case, the failure region F0 does not straddle boundaries between the first colorimetric area SD1 and the second colorimetric area SD2, and between the second colorimetric area SD2 and the third colorimetric area SD3. Therefore, the colorimetric values of the first colorimetric area SD1, the third colorimetric area SD3 and the fourth colorimetric area SD4 are not abnormal, and accordingly the above colorimetric areas become effective areas. Therefore, the colorimeter acquires the colorimetric values from which only the second colorimetric area SD2 has been eliminated. In this case, it is originally desirable to adopt the average value of the four areas as the colorimetric result, but the average value of the three areas is regarded to be equal as the colorimetric result, and is adopted as the second image information. When such processing has been carried out, the colorimeter stores therein that the colorimetric result is obtained from the three areas. Incidentally, the failure region F0 corresponds to the exclusion detection region of the present invention, and the detection result of the line sensor 202 corresponds to the first image information. In addition, the first image information may be configured to include information on the failure region.

Next, means for selecting the colorimetric area will be described below.

Firstly, in the case where the patch results in already reaching the colorimeter 203 at about the time when the image analysis result for the detection result by the line sensor 201 is output, the colorimeter 203 once memorizes the colorimetric results of the combination of each of the first to fourth colorimetric areas in the memory section, as is shown in FIG. 10. When there is no abnormality in particular, the colorimeter acquires the results of each of the areas that are the first colorimetric area SD1, the second colorimetric area SD2, the third colorimetric area SD3 and the fourth colorimetric area SD4, as the colorimetric values. When there is abnormality (failure region F0) in the second colorimetric area SD2, the control section acquires the colorimetric results of the first colorimetric area SD1, the third colorimetric area SD3 and the fourth colorimetric area SD4, as the second image information. After having acquired the individual colorimetric results of the first colorimetric area SD1, the second colorimetric area SD2, the third colorimetric area SD3 and the fourth colorimetric area SD4 from the colorimeter 203, the image forming apparatus 10 may subjects the colorimetric values in the first colorimetric area SD1, the third colorimetric area SD3 and the fourth colorimetric area SD4 to averaging processing, and may use the average value as the second image information.

Incidentally, in the case where the failure region is excluded based on the first image information after all of the colorimetric results have been acquired as have been described above, the form is acceptable in which after the colorimeter 203 has measured the color of the image patch, the line sensor 201 measures the color. This form is also included in the range of the present invention.

Next, in the case where when the image analysis result of the line sensor 201 has been obtained, the patch does not reach the colorimeter 203, the reading control section determines an abnormal region F0 from the detection result by the line sensor 201, and notifies the state that the second colorimetric area SD2 is abnormal, to the colorimeter 203 beforehand. In this case, the detection result by the line sensor may be defined as the first image information, or the detection result after analysis and the detection result concerning the abnormal region may also be defined as the first image information. The colorimeter 203 can regard the detection result in the area of the second colorimetric area SD2 as the exclusion detection region, exclude the detection result from the detection results, subject the detection values in the first colorimetric area SD1, the third colorimetric area SD3 and the fourth colorimetric area SD4 to averaging processing, and thus derive the colorimetric result; and the image reading apparatus 20 or 20A, the image forming apparatus 10 or the management apparatus 5 can acquire this result as the second image information.

Next, an example of correcting the timing signal will be described below.

The action in this example is based on a premise that the image analysis in the line sensor is completed before the patch image passes through the colorimeter.

Figure 11:
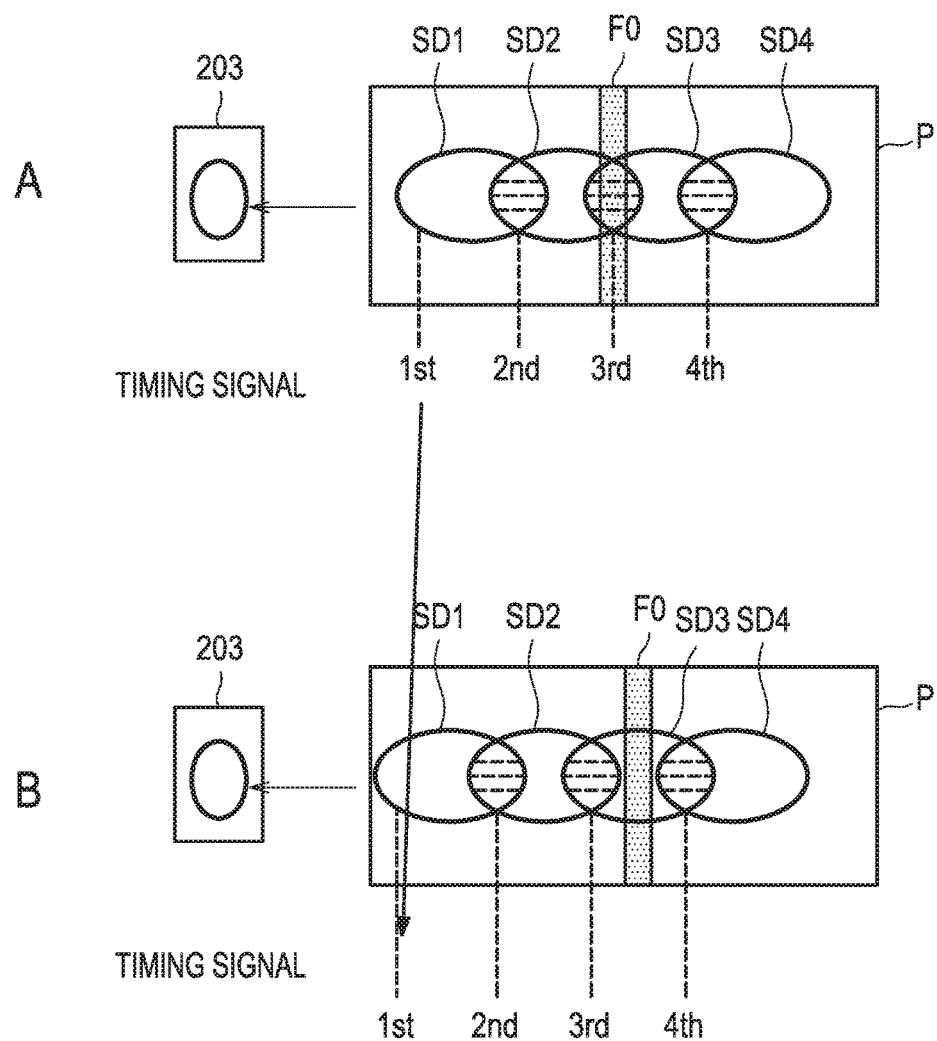
FIG. 11 is a view for describing an example in which there is the image failure in the image patch, and an example in which the image reading apparatus according to the present embodiment measures the color while avoiding the image failure.

In FIG. A of FIG. 11, the case is shown in which the abnormal region F0 exists in a portion that straddles a boundary between the second colorimetric area SD2 and the third colorimetric area SD3. In this case, the effective areas by the colorimetric result become the first colorimetric area SD1 and the fourth colorimetric area SD4. Here, suppose that a predetermined amount of the required colorimetric accuracy cannot be secured by the average value of the colorimetric values in the two areas, the timing signal section deviates the timing signal, and the colorimeter can increase areas of which the colorimetric values can be averaged. Incidentally, the reading control section can previously determine the required predetermined amount and store the amount in the memory section 106 or the like. In addition, the reading control section may set a plurality of predetermined amounts on different conditions, and may also set the predetermined amount so that an operator can change the amount.

The colorimeter starts the colorimetry from the leading-edge portion of the patch as in FIG. B of FIG. 11, and thereby the abnormal image in the portion that straddles a boundary between the second colorimetric area SD2 and the third colorimetric area SD3 becomes the abnormal image which exists only in the third colorimetric area SD3. The reading control section can regard the region on the image as the exclusion detection region, and acquire the colorimetric result in a form of the average value of the three areas which are the first colorimetric area SD1, the second colorimetric area SD2 and the fourth colorimetric area SD4, as the second image information. This is a coping method which can be adopted when the patch size has a latitude.

Figure 12:
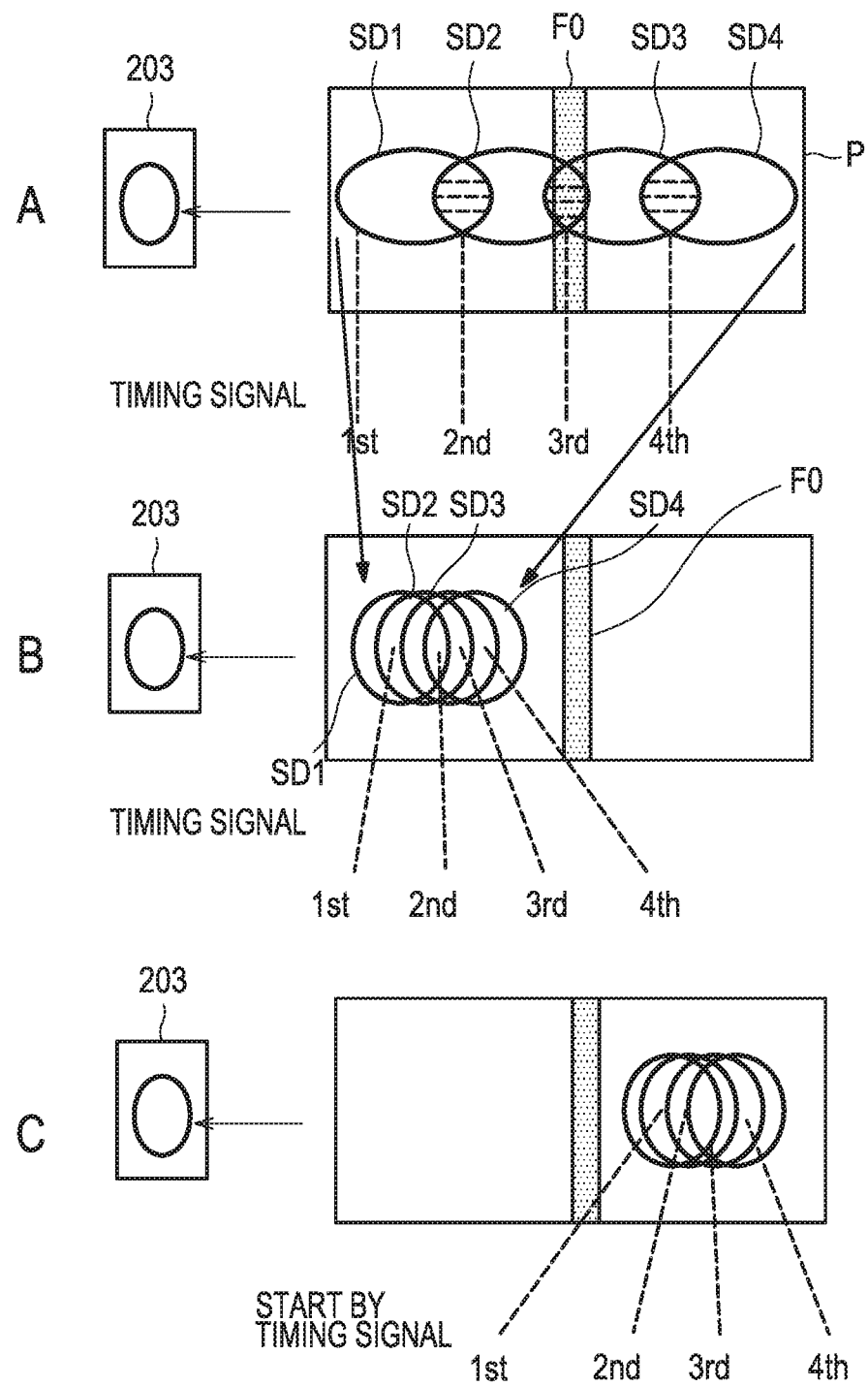
FIG. 12 is a view for describing an example in which there is the image failure in the image patch, and an example in which the image reading apparatus according to the present embodiment measures the color while avoiding the image failure by correcting detection timing.

Next, an example in which the reading control section lowers the conveyance speed of the patch paper will be described below with reference to FIG. 12.

The action in this example is based on a premise that the image analysis in the line sensor is completed before the patch image passes through the colorimeter.

In this example, the control section secures the colorimetric time period by lowering the conveyance speed of the patch paper or by stopping the paper. In FIG. A of FIG. 12, the case is shown in which the abnormal image exists in a portion that straddles a boundary between the second colorimetric area SD2 and the third colorimetric area SD3. In this case, the effective areas become the first colorimetric area SD1 and the fourth colorimetric area SD4. Here, the average value of the colorimetric values of the two areas is insufficient for the predetermined amount and cannot secure the required colorimetric accuracy, and accordingly it is necessary to increase the areas of which the colorimetric values are averaged. However, the original patch size does not have sufficiently a margin, and accordingly the colorimetric area results in protruding from the patch size, by only such an operation that the timing signal section deviates the timing signal as in FIG. 11. Therefore, when the position of the abnormal image has been discerned, it is considered that the control section reduces the conveyance speed of the paper which contains the corresponding patch, or stops the conveyance.

The portion which straddles an area between the second colorimetric area SD2 and the third colorimetric area SD3 exists in approximately the middle of the patches, and accordingly when the area in which the patch is detected is reduced to ⅓, the portion of the abnormal image can be avoided from being measured. Suppose that the standard paper conveyance speed is 450 mm/second, for instance, the control section reduces the conveyance speed to 150 mm/second which is ⅓ of the standard speed. As is shown in FIG. B of FIG. 12, the colorimeter results in measuring the color in the area of ⅓ while keeping the necessary time period for acquiring the spectrum of reflected light at the same time period, and as a result, can measure the color four times in the patch and can average the values.

In the case where there are many abnormal portions, as long as the control section stops once the conveyance of the paper and thereby can secure the area of the colorimetric spot, the colorimeter can measure the color four times in the same area and can average the measured values. As in FIG. C of FIG. 12, also when the timing signal section shifts the timing signal to the backward direction of the patch and the control section reduces the conveyance speed to ⅓, the colorimeter can measure the color of the normal patch portion in the backward side of the abnormal image four times and can average the measured values. Therefore, the reading control section varies the timing signal and the conveyance speed according to the position of the abnormal image in the patch, thereby the colorimeter can measure the color in the normal patch position, and the control section can acquire the second image information.

Figure 13:
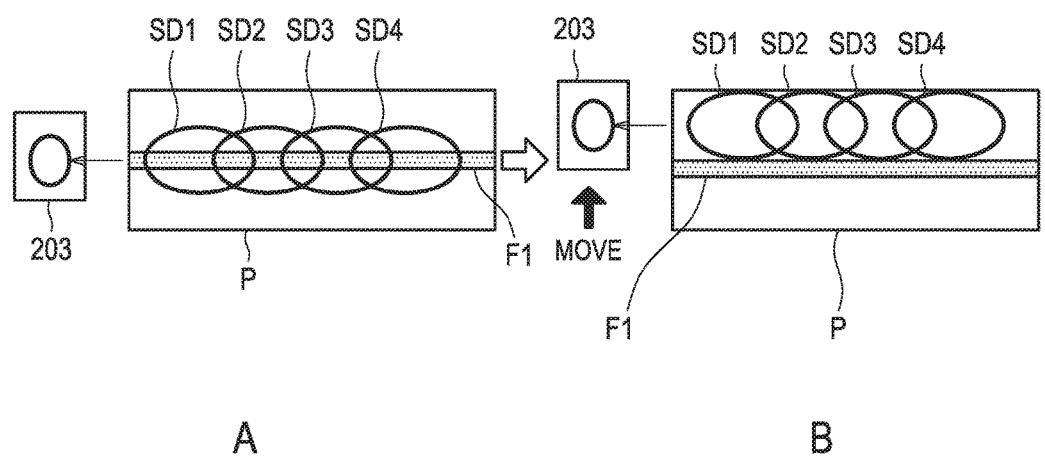
FIG. 13 is a view for describing an example in which there is the image failure in the image patch, and an example in which the image reading apparatus according to the present embodiment measures the color while avoiding the image failure.

Next, an example in the case where there are abnormal images in all of the patches in the paper travel direction is shown in FIG. A of FIG. 13. In this case, the control section moves one or both of the colorimeter 203 and the paper in the scanning direction so that the colorimeter 203 or the paper becomes a portion having no abnormal image therein. Thereby, as is shown in FIG. B, the first to fourth colorimetric areas SD1, SD2, SD3 and SD4 can be prevented from covering the failure region F1. In addition, when the failure image portion diagonally exists, the control section can deviate the failure image portion so that the accuracy can become surely a predetermined amount.

In the case where there are many abnormal region portions, as long as the control section stops once the conveyance of the paper and thereby can secure the area of the colorimetric spot, the colorimeter can measure the color four times in the same area and can average the measured values; and accordingly can measure the color even though the abnormal image exists in a direction perpendicular to the paper traveling direction.

Figure 14:
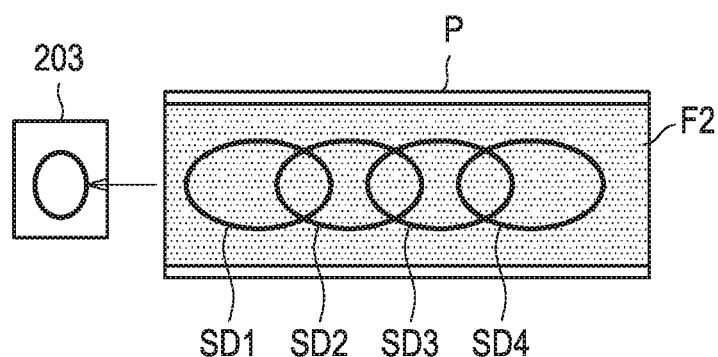
FIG. 14 is a view showing an example in which there is the image failure in the image patch.

Next, such an example is shown in FIG. 14 that there is no area of which the color can be correctly measured in the patch. In this case, the failure region F2 is large, and such an effective colorimetric area is not found in the patch P as to fit in the first to fourth colorimetric areas SD1, SD2, SD3 and SD4 in the spot of the colorimeter 203.

In this case, the control section determines that the colorimetry is impossible, and does not reflect the colorimetric result. As a result, the image forming apparatus prints the patch again, and the colorimeter can measure the color.

Figure 15:
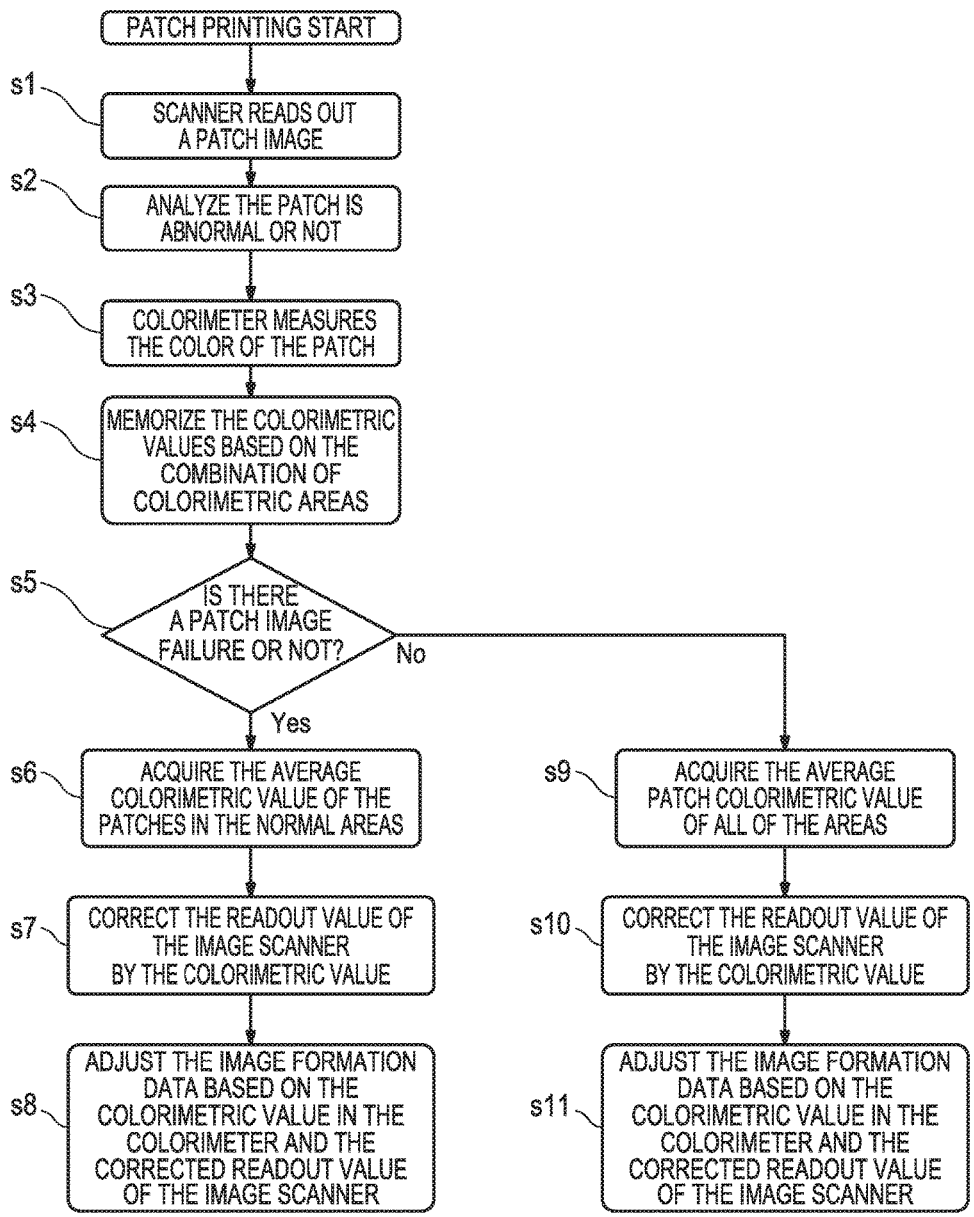
FIG. 15 is a flow chart for describing a procedure in which an image forming apparatus calibrates a line sensor and adjusts an image while avoiding an exclusion detection region, in an embodiment of the present invention.

Next, a procedure of processing in which when there is the failure image, the colorimeter obtains the colorimetric value by removing the exclusion detection region from the colorimetric detection result will be described below with reference to a flow chart in FIG. 15.

Firstly, in response to the start of patch printing, an image scanner of a line sensor reads out a patch image (step s1). Subsequently, the control section analyzes whether there is an abnormal patch or not, from the detection result of the line sensor (step s2). The detection result of the line sensor is processed as the first image information. The region of the abnormal patch becomes the exclusion detection region. In addition, the first image information may be configured to include the information on the exclusion detection region.

In the image forming system 1 in FIG. 1, the reading control section 200 may analyze the abnormal region, or may transmit the readout result to the image forming apparatus 10, and the image forming control section 100 may analyze the abnormal region. In the image forming system 1A in FIG. 3, the image forming control section 100 can analyze the abnormal region. In addition, in the image forming system in FIG. 4, it is also acceptable that the image reading apparatus transmits the readout result to the management apparatus 5 which manages the image forming apparatus, and the management control section 500 of the management apparatus 5 analyzes the readout result.

After the analysis, the colorimeter measures the color of the patch (step s3). The procedure memorizes the colorimetric values based on the combination of colorimetric values in a plurality of colorimetric areas, in the memory section (step s4). The memory of the colorimetric values may be stored in the memory section 206 of the image reading apparatus 20 or the image reading apparatus 20A, or in the memory section 106 of the image forming apparatus 10 or the image forming apparatus 10A. Furthermore, the memory section 510 of the management apparatus 5 may also be configured to store the values therein.

After the memory section has memorized the colorimetric value, the control section determines whether there is a patch image failure or not (step s5). The determination result is obtained in processing of the abnormal patch analysis. The determination may be performed in the reading control section 200, or may be performed in the image forming control section 100. Furthermore, the determination may also be performed in the management control section 500.

When there is no image failure (step s5, No), the colorimeter acquires the average patch colorimetric value of all of the areas (step s9), and the control section corrects the readout value of the image scanner in the line sensor by the colorimetric value, in the calibration mode (step s10). Thereby, the line sensor becomes possible to measure the color of the whole surface of the paper. The correction may be performed in the reading control section 200, or may be performed in the image forming control section 100. Furthermore, the correction may also be performed in the management control section 500.

In an appropriate period, the control section can adjust the image forming data based on the colorimetric value in the colorimeter and the corrected readout value of the image scanner in the line sensor (step s11). In this case, it is also possible that the line sensor after the calibration adjusts the image forming data by itself.

On the other hand, when there is a patch image failure (step s5, Yes), the control section acquires the average colorimetric value of the patches in the normal areas in the detection region in which the exclusion detection region has been removed, as the second image information (step s6); corrects the readout value of the image scanner by the colorimetric value (step s7); and adjusts image formation data, based on the colorimetric value in the colorimeter and the corrected readout value of the image scanner in the line sensor, in an appropriate time period (step s8). Incidentally, the acquisition of the colorimetric value in step s6, the correction of the readout value in step s7, and the adjustment of the image formation data in step s8 may be performed in the reading control section 200 similarly to steps s9 to s11, and may also be performed in the image forming control section 100. Furthermore, the above procedures may be performed in the management control section 500.

Incidentally, after the control section has acquired the individual colorimetric results in the first to fourth colorimetric areas from the colorimeter, the image forming apparatus may subject the colorimetric results in the first colorimetric area, the third colorimetric area and the fourth colorimetric area to averaging processing.

Figure 16:
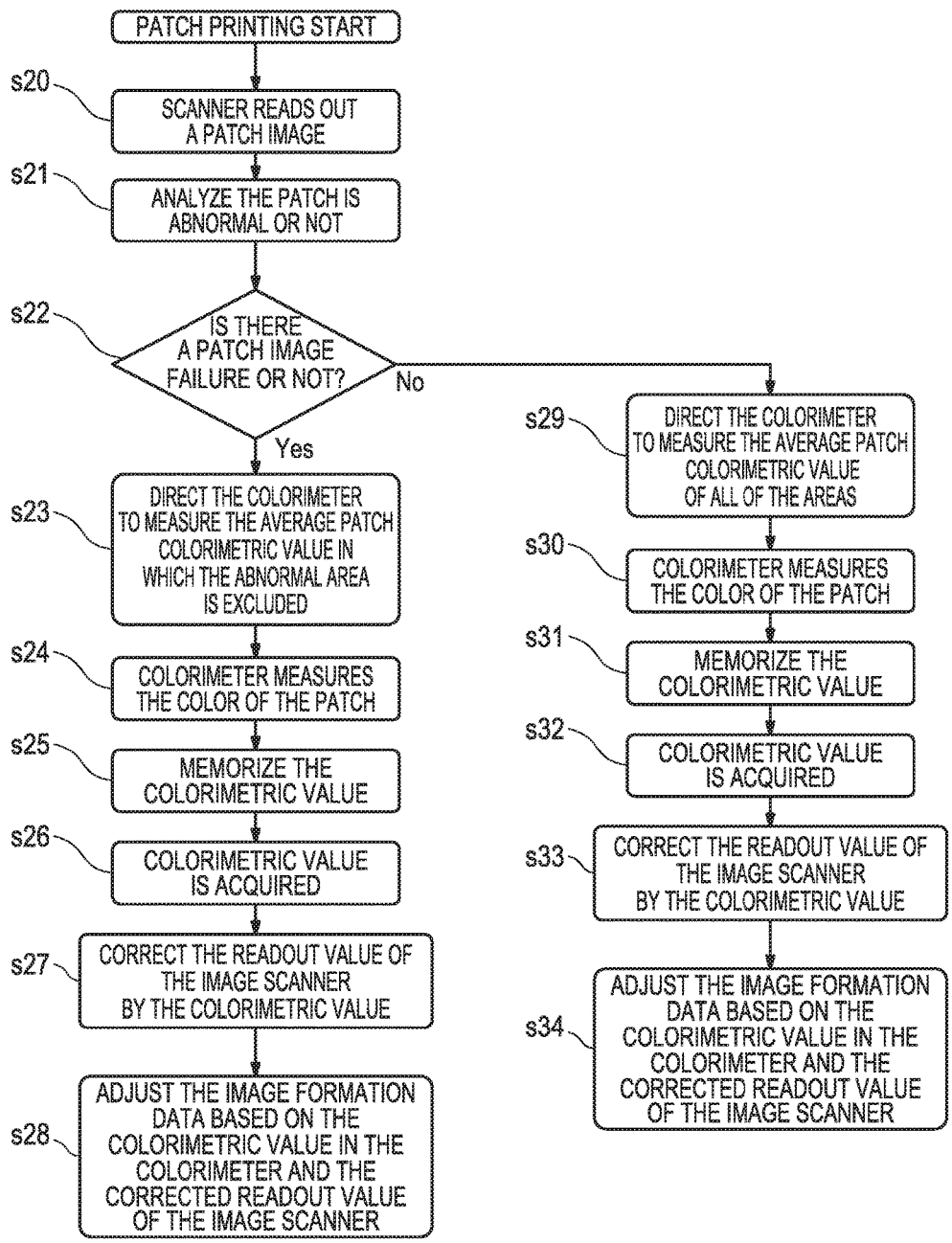
FIG. 16 is a flow chart for describing a procedure in which an image forming apparatus calibrates the line sensor and adjusts the image while avoiding the exclusion detection region, in another embodiment of the present invention.

Next, the procedure in which after the control section has analyzed the abnormal image in the line sensor, the colorimeter measures the color in regions in which the exclusion detection region has been removed, and the control section acquires the second image information will be described below with reference to a flow chart in FIG. 16.

Firstly, in response to the start of patch printing, an image scanner of a line sensor reads out a patch image (step s20). Subsequently, the control section analyzes whether there is an abnormal patch or not, from the detection result of the line sensor (step s21). The detection result of the line sensor is processed as the first image information. The region of the abnormal patch becomes the exclusion detection region. In addition, the first image information may be configured to include the information on the exclusion detection region.

In the image forming system 1 in FIG. 1, the reading control section 200 may analyze the abnormality, or may transmit the readout result to the image forming apparatus 10, and the image forming control section 100 may analyze the abnormal region. In the image forming system 1A in FIG. 3, the image forming control section 100 can analyze the abnormal region. In addition, in the image forming system in FIG. 4, it is also acceptable that the image reading apparatus transmits the readout result to the management apparatus 5 which manages the image forming apparatus, and the management control section 500 of the management apparatus 5 analyzes the readout result.

Next, the control section determines whether there is the patch image failure or not (step s22). The determination result is obtained in the processing of the abnormal patch analysis. The determination may be performed in the reading control section, or may be performed in the image forming control section. Furthermore, the determination may also be performed in the management control section 500.

When there is no image failure (step 22, No), the control section directs the colorimeter so as to measure the colors of the patches in all of the areas and average the colors (step s29), and the colorimeter 203 measures the colors of the patches (step s30). Subsequently, the memory section memorizes the colorimetric values therein (step s31). The memory of the colorimetric values may be stored in the memory section 206 of the image reading apparatus 20 or the image reading apparatus 20A, or in the memory section 106 of the image forming apparatus 10 or the image forming apparatus 10A. Furthermore, the memory section 510 of the management apparatus 5 may also be configured to store the values therein.

After that, the control section acquires the colorimetric value from the memory section (step s32), and corrects the readout value of the image scanner in the line sensor by the colorimetric value, in the calibration mode (step s33). The correction may be performed in the reading control section 200, or may be performed in the image forming control section 100. Furthermore, the correction may also be performed in the management control section 500.

In an appropriate period, the control section adjusts the image forming data, based on the colorimetric value in the colorimeter and the corrected readout value of the image scanner in the line sensor (step s34).

On the other hand, when there is the patch image failure (step s22, Yes), the control section directs the colorimeter so as to measure the color in the regions in which the exclusion detection region has been removed (step s23). Subsequently, the colorimeter measures the color of the patch (step s24), and the colorimetric values are recorded in the memory of the memory section (step s25). The memory of the colorimetric values may be stored in the memory section 206 of the image reading apparatus 20 or the image reading apparatus 20A, or in the memory section 106 of the image forming apparatus 10 or the image forming apparatus 10A. Furthermore, the memory section 510 of the management apparatus 5 may also be configured to store the values therein.

Subsequently, the colorimetric value is acquired (step s26). The reading control section 200, the image forming control section 100, the management control section 500 or the like can acquire the colorimetric value.

When the colorimetric value has been acquired, the control section corrects the readout value of the image scanner in the line sensor by the colorimetric value, in the calibration mode (step s27), and adjusts the image forming data, based on the colorimetric value in the colorimeter and the corrected readout value of the image scanner in the line sensor, in an appropriate time period (step s28).

Figure 17:
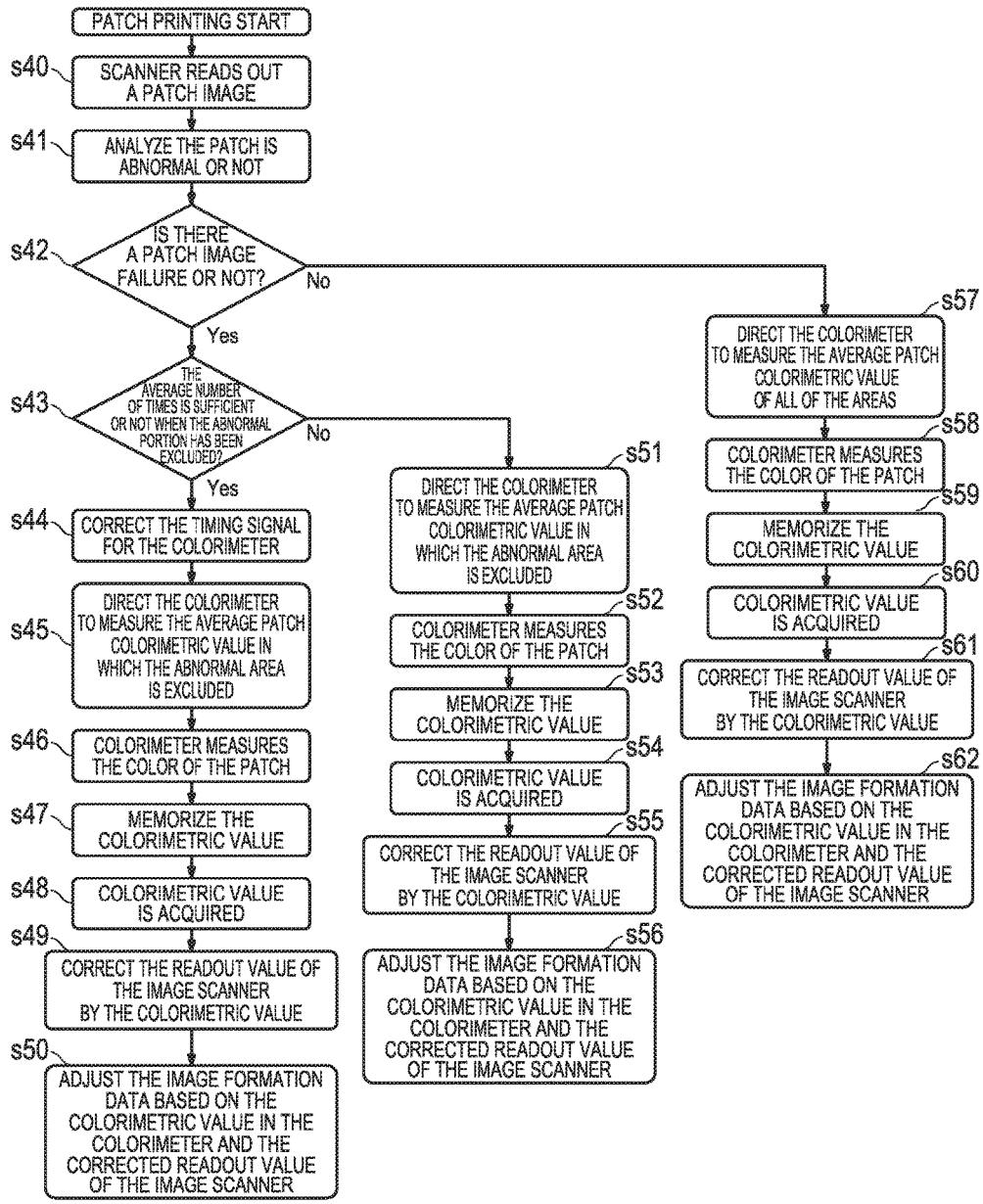
FIG. 17 is a flow chart for describing a procedure in which an image forming apparatus calibrates the line sensor and adjusts the image while avoiding the exclusion detection region, in further another embodiment of the present invention.

Next, the procedure in which after the control section has analyzed the abnormal image in the line sensor, the colorimeter 203 acquires the second image information in which the exclusion detection region has been removed, according to the change of the colorimetric timing will be described below with reference to a flow chart in FIG. 17.

Firstly, in response to the start of patch printing, an image scanner of a line sensor reads out a patch image (step s40). Subsequently, the control section analyzes whether there is the abnormal patch or not, from the detection result of the line sensor (step s41). The detection result of the line sensor is processed as the first image information. The region of the abnormal patch becomes the exclusion detection region. In addition, the first image information may be configured to include the information on the exclusion detection region.

In the image forming system 1 in FIG. 1, the reading control section 200 may analyze the abnormal portion, or may transmit the readout result to the image forming apparatus 10, and the image forming control section 100 may analyze the abnormal portion. In the image forming system 1A in FIG. 3, the image forming control section 100 can analyze the abnormal portion. In addition, in the image forming system in FIG. 4, it is also acceptable that the image reading apparatus transmits the readout result to the management apparatus 5 which manages the image forming apparatus, and the management control section 500 of the management apparatus 5 analyzes the readout result.

Next, the control section determines whether there is the patch image failure or not (step s42). The determination result is obtained in processing of the abnormal patch analysis. The determination may be performed in the reading control section 200, or may be performed in the image forming control section 100. Furthermore, the determination may also be performed in the management control section 500.

When there is no image failure (step s42, No), the control section directs the colorimeter so as to measure the colors of the patches in all of the areas and average the colors (step s57), and the colorimeter measures the colors of the patches (step s58). Subsequently, the memory section memorizes the colorimetric values therein (step s59). The memory of the colorimetric value may be stored in the memory section 206 of the image reading apparatus 20 or the image reading apparatus 20A, or in the memory section 106 of the image forming apparatus 10 or the image forming apparatus 10A. Furthermore, the memory section 510 of the management apparatus 5 may also be configured to store the values therein.

After that, the control section acquires the colorimetric value from the memory section (step s60), and corrects the readout value of the image scanner in the line sensor by the colorimetric value, in the calibration mode (step s61). The correction may be performed in the reading control section, or may be performed in the image forming control section. Furthermore, the correction may also be performed in the management control section 500.

In an appropriate period, the control section adjusts the image forming data, based on the colorimetric value in the colorimeter and the corrected readout value of the image scanner in the line sensor (step s62).

On the other hand, when there is the patch image failure (step s42, Yes), the control section determines whether when the abnormal portion has been excluded, the average number of times is sufficient or not, in other words, the accuracy satisfies the predetermined amount or not (step s43).

When the number of times is the average number of times or more (step s43, No), the control section directs the colorimeter so as to measure the colors in the regions in which the exclusion detection region has been removed (step s51). Subsequently, the colorimeter measures the colors of the patches (step s52), and the colorimetric value is recorded in the memory of the memory section (step s53). The memory of the colorimetric value may be stored in the memory section 206 of the image reading apparatus 20 or the image reading apparatus 20A, or in the memory section 106 of the image forming apparatus 10 or the image forming apparatus 10A. Furthermore, the memory section 510 of the management apparatus 5 may also be configured to store the values therein.

Subsequently, the colorimetric value is acquired (step s54). The reading control section, the image forming control section, the management control section or the like can acquire the colorimetric value.

When the colorimetric value has been acquired, the control section corrects the readout value of the image scanner in the line sensor by the colorimetric value, in the calibration mode (step s55), and adjusts the image forming data, based on the colorimetric value in the colorimeter and the corrected readout value of the image scanner in the line sensor, in an appropriate time period (step s56).

In addition, in the case where the average number of times becomes insufficient when the abnormal portion has been excluded (step s43, Yes), the control section corrects the timing signal for the colorimeter so as to secure a predetermined area in the patch (step s44), and directs the colorimeter so as to measure the colors of patches from which the abnormal area has been removed and average the colors (step s45). Subsequently, the colorimeter measures the colors of the patches according to the direction (step s46), and the colorimetric values are recorded in the memory of the memory section (step s47). The memory of the colorimetric value may be stored in the memory section 206 of the image reading apparatus 20 or the image reading apparatus 20A, or in the memory section 106 of the image forming apparatus 10 or the image forming apparatus 10A. Furthermore, the memory section 510 of the management apparatus 5 may also be configured to store the values therein.

Subsequently, the colorimetric value is acquired (step s48). The reading control section 200, the image forming control section 100, the management control section 500 or the like can acquire the colorimetric value.

When the colorimetric value has been acquired, the control section corrects the readout value of the image scanner in the line sensor by the colorimetric value, in the calibration mode (step s49), and adjusts the image forming data, based on the colorimetric value in the colorimeter and the corrected readout value of the image scanner in the line sensor, in an appropriate time period (step s50).

Next, the procedure in which when the line sensor recognizes that there is the abnormal image, the colorimeter removes the exclusion detection area according to the change of the colorimetric timing or the change of the conveyance speed and measures the color will be described below with reference to a flow chart in FIG. 18.

Firstly, in response to the start of patch printing, the image scanner of the line sensor reads out a patch image (step s70). Subsequently, the control section analyzes whether there is the abnormal patch or not, from the detection result of the line sensor (step s71). The detection result of the line sensor is processed as the first image information. The region of the abnormal patch becomes the exclusion detection region. In addition, the first image information may be configured to include the information on the exclusion detection region.

In the image forming system 1 in FIG. 1, the reading control section 200 may analyze the abnormal portion, or may transmit the readout result to the image forming apparatus 10, and the image forming control section 100 may analyze the abnormal portion. In the image forming system 1A in FIG. 3, the image forming control section 100 can analyze the abnormal portion. In addition, in the image forming system in FIG. 4, it is also acceptable that the image reading apparatus transmits the readout result to the management apparatus 5 which manages the image forming apparatus, and the management control section 500 of the management apparatus 5 analyzes the readout result.

Next, the control section determines whether there is the patch image failure or not (step s72). The determination result is obtained in processing of the abnormal patch analysis. The determination may be performed in the reading control section 200, or may be performed in the image forming control section 100. Furthermore, the determination may also be performed in the management control section 500.

When there is no image failure (step s72, No), the control section directs the colorimeter 203 so as to measure the colors of the patches in all of the areas and average the colors (step s96), and the colorimeter 203 measures the colors of the patches (step s97). Subsequently, the memory section memorizes the colorimetric values therein (step s98). The memory of the colorimetric value may be stored in the memory section 206 of the image reading apparatus 20 or the image reading apparatus 20A, or in the memory section 106 of the image forming apparatus 10 or the image forming apparatus 10A. Furthermore, the memory section 510 of the management apparatus 5 may also be configured to store the values therein.

After that, the control section acquires the colorimetric value from the memory section (step s99), and corrects the readout value of the image scanner in the line sensor by the colorimetric value, in the calibration mode (step s100). The correction may be performed in the reading control section 200, or may be performed in the image forming control section 100. Furthermore, the correction may be performed in the management control section 500.

In an appropriate period, the control section adjusts the image forming data, based on the colorimetric value in the colorimeter and the corrected readout value of the image scanner in the line sensor (step s101).

On the other hand, when there is the patch image failure (step s72, Yes), the control section determines whether when the exclusion detection region has been removed, the average number of times is sufficient or not, in other words, the accuracy satisfies the predetermined amount or not (step s73).

When the average number of times or more is obtained (step s73, No), the control section directs the colorimeter so as to measure the colors in the regions in which the exclusion detection region has been removed (step s90). Subsequently, the colorimeter measures the colors of the patches according to the direction (step s91), and the colorimetric values are recorded in the memory of the memory section (step s92). The memory of the colorimetric values may be stored in the memory section 206 of the image reading apparatus 20 or the image reading apparatus 20A, or in the memory section 106 of the image forming apparatus 10 or the image forming apparatus 10A. Furthermore, the memory section 510 of the management apparatus 5 may also be configured to store the values therein.

Subsequently, the colorimetric value is acquired (step s93). The reading control section 200, the image forming control section 100, the management control section 500 or the like can acquire the colorimetric value.

When the colorimetric value has been acquired, the control section corrects the readout value of the image scanner in the line sensor by the colorimetric value, in the calibration mode (step s94), and adjusts the image forming data, based on the colorimetric value in the colorimeter and the corrected readout value of the image scanner in the line sensor, in an appropriate time period (step s95).

In the case where the average number of times becomes insufficient when the abnormal portion has been excluded (step s73, Yes), the control section determines whether or not to change the conveyance speed by correcting the timing signal (step s74). This determination can be performed based on whether or not the processing can be performed only by the correction of the timing signal.

When changing the conveyance speed (step s74, Yes), the control section lowers the paper conveyance speed (step s75). The control section lowers the paper conveyance speed usually before the colorimeter reads out the image patch, but may lower the conveyance speed during the colorimetry.

Subsequently, the control section corrects the timing signal for the colorimeter (step s76), and directs the colorimeter so as to measure the colors of the patches in all of the areas and average the colors (step s77). Subsequently, the colorimeter measures the colors of the patches according to the direction (step s78), and the colorimetric values are recorded in the memory of the memory section (step s79). The memory of the colorimetric values may be stored in the memory section 206 of the image reading apparatus 20 or the image reading apparatus 20A, or in the memory section 106 of the image forming apparatus 10 or the image forming apparatus 10A. Furthermore, the memory section 510 of the management apparatus 5 may also be configured to store the values therein.

Subsequently, the colorimetric value is acquired (step s80). The reading control section, the image forming control section, the management control section or the like can acquire the colorimetric value.

When the colorimetric value has been acquired, the control section corrects the readout value of the image scanner in the line sensor by the colorimetric value, in the calibration mode (step s81), and adjusts the image forming data, based on the colorimetric value in the colorimeter and the corrected readout value of the image scanner in the line sensor, in an appropriate time period (step s82).

When the control section does not change the conveyance speed (step s74, No), the control section corrects the timing signal for the colorimeter (step s83), and directs the colorimeter so as to measure the colors of patches from which the abnormal area has been removed and average the colors (step s84). Subsequently, the colorimeter measures the colors of the patches according to the direction (step s85), and the colorimetric values are recorded in the memory of the memory section (step s86). The memory of the colorimetric values may be stored in the memory section 206 of the image reading apparatus 20 or the image reading apparatus 20A, or in the memory section 106 of the image forming apparatus 10 or the image forming apparatus 10A. Furthermore, the memory section 510 of the management apparatus 5 may also be configured to store the values therein.

Subsequently, the colorimetric value is acquired (step s87). The reading control section 200, the image forming control section 100, the management control section 500 or the like can acquire the colorimetric value.

When the colorimetric value has been acquired, the control section corrects the readout value of the image scanner in the line sensor by the colorimetric value, in the calibration mode (step s88), and adjusts the image forming data, based on the colorimetric value in the colorimeter and the corrected readout value of the image scanner in the line sensor, in an appropriate time period (step s89).

Figure 19:
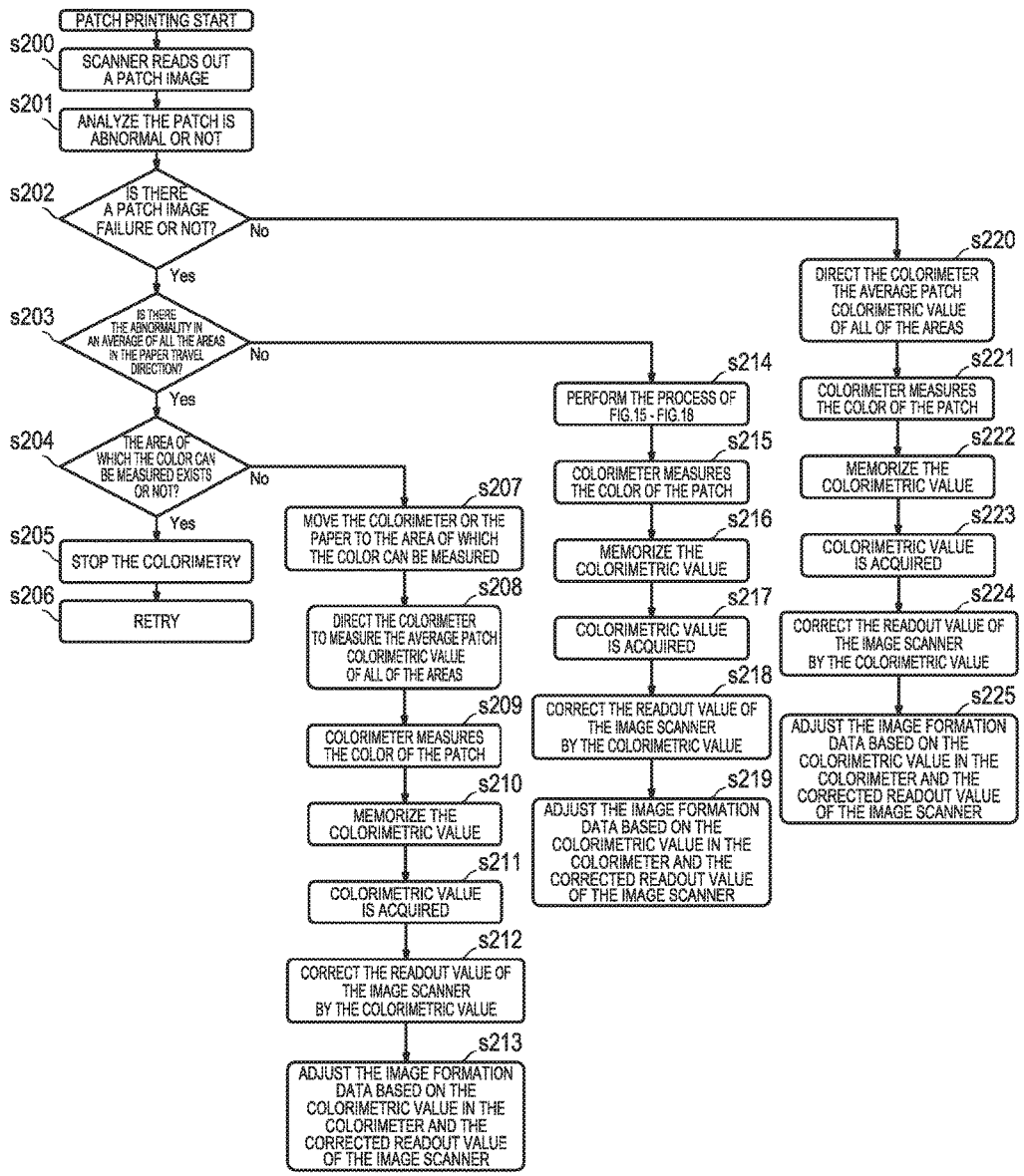
FIG. 19 is a flow chart for describing a procedure in which an image forming apparatus calibrates the line sensor and adjusts the image while avoiding the exclusion detection region, in further another embodiment of the present invention.

Next, the procedure of changing the processing according to whether there is the image failure in all of areas of which the color can be measured will be described below with reference to a flow chart in FIG. 19.

Firstly, in response to the start of patch printing, an image scanner of a line sensor reads out a patch image (step s200). Subsequently, the control section analyzes whether there is an abnormal patch or not, from the detection result of the line sensor (step s201). The detection result of the line sensor is processed as the first image information. The region of the abnormal patch becomes the exclusion detection region. In addition, the first image information may be configured to include the information on the exclusion detection region.

In the image forming system 1 in FIG. 1, the reading control section 200 may analyze the abnormal portion, or may transmit the readout result to the image forming apparatus 10, and the image forming control section 100 may analyze the abnormal portion. In the image forming system 1A in FIG. 3, the image forming control section 100 can analyze the abnormal portion. In addition, in the image forming system in FIG. 4, it is also acceptable that the image reading apparatus transmits the readout result to the management apparatus 5 which manages the image forming apparatus, and the management control section 500 of the management apparatus 5 analyzes the readout result.

Next, the control section determines whether there is the patch image failure or not (step s202). The determination result is obtained in the processing of the abnormal patch analysis. The determination may be performed in the reading control section, or may be performed in the image forming control section. Furthermore, the determination may also be performed in the management control section.

When there is no image failure (step 202, No), the control section directs the colorimeter so as to measure the colors of the patches in all of the areas and average the colors (step s220), and the colorimeter measures the colors of the patches (step s221). Subsequently, the memory section memorizes the colorimetric values therein (step s222). The memory of the colorimetric values may be stored in the memory section 206 of the image reading apparatus 20 or the image reading apparatus 20A, or in the memory section 106 of the image forming apparatus 10 or the image forming apparatus 10A. Furthermore, the memory section 510 of the management apparatus 5 may also be configured to store the values therein.

After that, the control section acquires the colorimetric value from the memory section (step s223), and corrects the readout value of the image scanner in the line sensor by the colorimetric value, in the calibration mode (step s224). The correction may be performed in the reading control section 200, or may be performed in the image forming control section 100. Furthermore, the correction may be performed in the management control section 500.

In an appropriate period, the control section adjusts the image forming data, based on the colorimetric value in the colorimeter and the corrected readout value of the image scanner in the line sensor (step s225).

On the other hand, when there is the patch image failure (step s202, Yes), the control section determines whether or not there is the abnormality in an average of all the areas in the paper travel direction (step s203). When there is the abnormality in the average of all the areas (step s203, Yes), the control section determines whether the area of which the color can be measured exists or not (step s204). If the area of which the color can be measured does not exist (step s204, Yes), the control section stops the colorimetry (step s205), and make a retry to draw the image patch again (step s206).

When there exists an area of which the color can be measured (step s204, No), the control section moves the colorimeter or the paper to the area of which the color can be measured (step s207). The control section may move both of the colorimeter and the paper. The control section directs the colorimeter so as to measure the colors of the patches in all of the areas and average the colors (step s208), and the colorimeter measures the colors of the patches (step s209). Subsequently, the memory section memorizes the colorimetric values therein (step s210). The memory of the colorimetric values may be stored in the memory section 206 of the image reading apparatus 20 or the image reading apparatus 20A, or in the memory section 106 of the image forming apparatus 10 or the image forming apparatus 10A. Furthermore, the memory section 510 of the management apparatus 5 may also be configured to store the values therein.

After that, the control section acquires the colorimetric value from the memory section (step s211), and corrects the readout value of the image scanner in the line sensor by the colorimetric value, in the calibration mode (step s212). The correction may be performed in the reading control section 200, or may be performed in the image forming control section 100. Furthermore, the correction may be performed in the management control section 500.

In an appropriate period, the control section adjusts the image forming data, based on the colorimetric value in the colorimeter and the corrected readout value of the image scanner in the line sensor (step s213).

In addition, when there is not the abnormality in the average of all the areas in the paper travel direction (step s203, No), the control section performs any one of the processes of the case where there is the abnormality in the patch image, which are shown in FIG. 15 to FIG. 18 (step s214). It can be previously determined which processing the control section performs. Specifically, in the processes shown in FIG. 15 and FIG. 16, the control section directs the colorimeter so as to measure the colors of patches of the normal areas and average the colors. In the process in FIG. 17, the processes in step s43 to step s45 (when average number of times is insufficient) or in step s43 to step s51 (average number of times is not insufficient) are performed.

Figure 18:
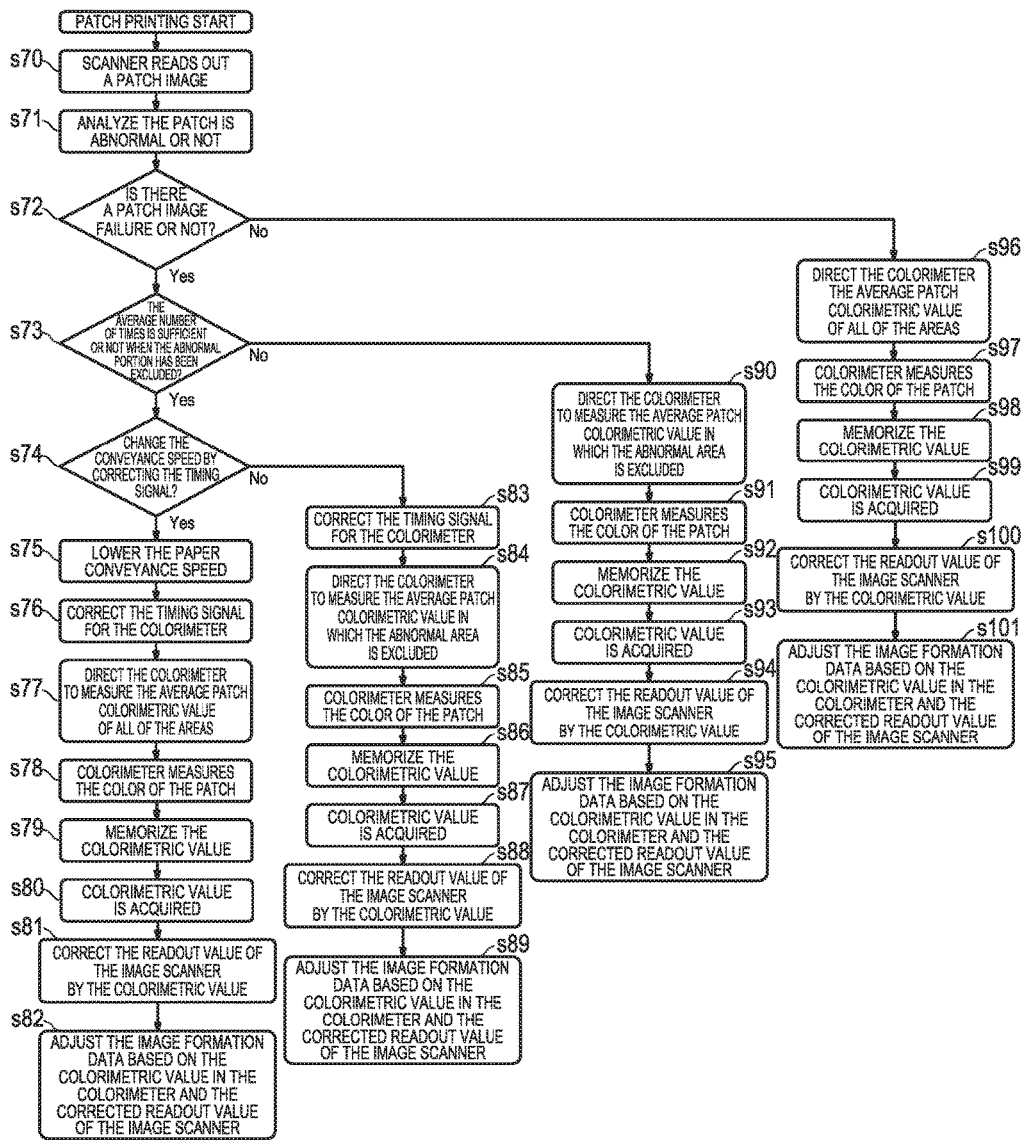
FIG. 18 is a flow chart for describing a procedure in which an image forming apparatus calibrates the line sensor and adjusts the image while avoiding the exclusion detection region, in further another embodiment of the present invention.

In the process in FIG. 18, the processes in step s73 to step s77 (when average number of times is insufficient, timing is corrected, and conveyance speed is changed), processes in step s73 to step s84 (when average number of times is insufficient, timing is corrected, and conveyance speed is not changed) or processes in step s73 to step s90 (when average number of times is not insufficient) are performed.

Subsequently, the colorimeter measures the color of the patch (step s215), and the memory section memorizes the colorimetric value therein (step s216). The memory of the colorimetric values may be stored in the memory section 206 of the image reading apparatus 20 or the image reading apparatus 20A, or in the memory section 106 of the image forming apparatus 10 or the image forming apparatus 10A. Furthermore, the memory section 510 of the management apparatus 5 may also be configured to store the values therein.

After that, the control section acquires the colorimetric value from the memory section (step s217), and corrects the readout value of the image scanner in the line sensor by the colorimetric value, in the calibration mode (step s218). The correction may be performed in the reading control section, or may be performed in the image forming control section. Furthermore, the correction may be performed in the management control section 500.

In an appropriate period, the control section adjusts the image forming data, based on the colorimetric value in the colorimeter and the corrected readout value of the image scanner in the line sensor (step s219).

According to the present embodiment, the first image detecting section which has relatively higher failure detection accuracy than that of the second image detecting section detects the image on the transfer medium; the control section determines the exclusion detection region in which it has been determined that there is a failure in the image from the first image detection information on the basis of the detection result; and the second image detecting section which has relatively higher color measurement accuracy than that of the first image detecting section and detects the image on the transfer medium can obtain second image detection information in a region in which the exclusion detection region has been removed.

The present invention has been described above with reference to the above described embodiments, but the scope of the invention is not limited to the content of the above description, and the content of the above described embodiments can be appropriately changed into various forms as long as the content does not deviate from the scope of the present invention.

Although the present invention has been described and illustrated in detail, it is clearly understood that the same is by way of illustrated and example only and is not to be taken by way limitation, the scope of the present invention being interpreted by terms of the appended claims.

What is claimed is:

1. An image reading apparatus comprising:
a second image detecting section which has relatively higher color measurement accuracy than that of a first image detecting section and detects an image on a transfer medium; and
a reading control section which controls the second image detecting section, and also acquires first image detection information based on a result that the first image detecting section has detected the image, the first image detecting section having relatively higher failure detection accuracy than that of the second image detecting section,
wherein the reading control section acquires second image detection information in a region of an image that has been detected by the second image detecting section and in which an exclusion detection region has been removed, based on the exclusion detection region that has been determined to contain a failure in the image based on the first image detection information.

2. The image reading apparatus according to claim 1, wherein the reading control section determines the exclusion detection region, based on the first image detection information of the first image detecting section.

3. The image reading apparatus according to claim 1, wherein the first image detection information includes information on the exclusion detection region.

4. The image reading apparatus according to claim 1, wherein the reading control section acquires the second image detection information from the second image detecting section which detects the image in a region in which the exclusion detection region has been removed.

5. The image reading apparatus according to claim 1, wherein the reading control section acquires the second image detection information, based on a detection result in a region in which the exclusion detection region has been removed from a detection result by the second image detecting section.

6. The image reading apparatus according to claim 1, wherein the reading control section acquires the second image detection information, based on a result of having totalized a plurality of measurement results which have been detected by the second image detecting section, in a region in which the exclusion detection region has been removed.

7. The image reading apparatus according to claim 1, wherein the first image detection information is information that is notified from an image forming apparatus which has acquired a detection result of the first image detecting section.

8. The image reading apparatus according to claim 1, wherein the first image detecting section is provided in the image reading apparatus.

9. The image reading apparatus according to claim 1, wherein the reading control section transmits the second image detection information to an image forming apparatus that has notified the first image detection information to the image reading apparatus.

10. The image reading apparatus according to claim 1, further comprising a transfer medium conveyance section that conveys a transfer medium,
wherein the second image detecting section detects an image which is conveyed by the transfer medium conveyance section, and the reading control section further controls the transfer medium conveyance section.

11. The image reading apparatus according to claim 10, wherein in a case where the region in which the exclusion detection region has been removed does not reach a predetermined amount, the reading control section corrects detection timing of the second image detecting section.

12. The image reading apparatus according to claim 11, wherein in a case where the region in which the exclusion detection region has been removed does not reach the predetermined amount, the reading control section corrects the detection timing of the second image detecting section, and also lowers a conveyance speed of a transfer medium or stops conveyance of the transfer medium to secure a detection time period.

13. The image reading apparatus according to claim 10, wherein in a case where the region in which the exclusion detection region has been removed does not reach the predetermined amount or does not exist, in a conveyance direction of the transfer medium, the reading control section shifts one or both of the second image detecting section and the transfer medium in a direction that intersects with the conveyance direction of the transfer medium.

14. The image reading apparatus according to claim 1, wherein in a case where a normal region cannot be secured as the second image detection information, as a result of having removed the exclusion detecting region, the reading control section invalidates the detection result which the second image detecting section has acquired.

15. The image reading apparatus according to claim 1, wherein the first image detecting section is an image sensor and the second image detecting section is a spectral colorimeter.

16. An image forming apparatus comprising:
   an image forming section that forms an image on a transfer medium; and
   an image forming control section that controls the image forming section, and also acquires information on a detection result of the image on the transfer medium by a first image detecting section which has relatively higher failure detection accuracy than that of a second image detecting section, and information on a detection result of the image on the transfer medium by the second image detecting section which has relatively higher color measurement accuracy than that of the first image detecting section,
   wherein the image forming control section acquires second image detection information in a region that has been detected by the second image detecting section and in which an exclusion detection region has been removed, based on the exclusion detection region that has been determined to contain a failure in the image, by first image detection information based on the detection result of the first image detecting section.

17. The image forming apparatus according to claim 16, wherein the image forming control section acquires the second image detection information in the region in which the exclusion detection region has been removed, as information on the detection result of the second image detecting section.

18. The image forming apparatus according to claim 16, wherein the image forming control section determines the exclusion detection region, based on the first image detection information, and acquires the second image detection information, based on the detection result in the region in which the exclusion detection region has been removed from the detection result by the second image detecting section, based on the exclusion detection region.

19. An image forming system comprising:
   an image forming section that forms an image on a transfer medium;
   a first image detecting section that has relatively higher failure detection accuracy than that of a second image detecting section, and detects the image on the transfer medium;
   the second image detecting section that has relatively higher color measurement accuracy than that of the first image detecting section, and detects the image on the transfer medium; and
   a control section which controls the image forming section, and acquires information on a detection result of the first image detecting section and a detection result of the second image detecting section,
   wherein when it has been determined that there is a failure in the image, based on first image detection information by the detection result of the first image detecting section, the control section acquires second image detection information in a region that is detected by the second image detecting section and in which an exclusion detection region has been removed, based on the exclusion detection region.

20. The image forming system according to claim 19, wherein the control section prepares the second image detection information in the region that has been detected by the second image detecting section and in which the exclusion detection region has been removed, based on the exclusion detection region that has been determined to contain the failure in the image, based on the first image detection information.

21. The image forming system according to claim 19, wherein the control section sets the second image detection information in the region in which the exclusion detection region has been removed based on the exclusion detection region that has been obtained from the detection result of the first image detecting section.

22. An image forming method comprising:
   a step of determining an exclusion detection region that is determined to contain a failure in an image, from a detection result that a first image detecting section which has relatively higher failure detection accuracy than that of a second image detecting section has detected the image on a transfer medium; and
   a step of determining second image detection information in a region in which the exclusion detection region has been removed based on a detection result that the second image detecting section which has relatively higher color measurement accuracy than that of the first image detecting section has detected the image on the transfer medium.

23. The image forming method according to claim 22, further comprising a step of calibrating the first image detecting section, based on the second image detection information.

24. A non-transitory computer-readable recording medium that stores an image forming control program therein which is executed by a computer that controls an image forming apparatus, in order to make the image forming apparatus execute the image forming method according to claim 22.

25. The non-transitory computer-readable recording medium according to claim 24, which stores the image forming control program therein that is executed by the computer which controls the image forming apparatus, comprising a step of controlling calibration of the first image detecting section, based on the second image detection information.

26. An image reading apparatus comprising:
   a spectral colorimeter which has relatively higher color measurement accuracy than that of an image sensor and detects an image on a transfer medium; and
   a hardware processor which controls the spectral colorimeter, and also acquires first image detection information based on a result that the image sensor has detected the image, the image sensor having relatively higher failure detection accuracy than that of the spectral colorimeter,
   wherein the hardware processor acquires second image detection information in a region of an image that has been detected by the spectral colorimeter and in which an exclusion detection region has been removed, based on the exclusion detection region that has been determined to contain a failure in the image based on the first image detection information.

\* \* \* \* \*